US00RE38321E

(19) United States
(12) Reissued Patent
Uyama et al.

(10) Patent Number: US RE38,321 E
(45) Date of Reissued Patent: Nov. 18, 2003

(54) TRANSPARENT HOLOGRAM SEAL

(75) Inventors: Haruo Uyama, Tokyo (JP); Takahiro Harada, Satte (JP); Mitsuru Kano, Tokyo (JP); Nagahisa Matsudaira, Kasukabe (JP); Kazuhisa Hoshino, Chiba (JP); Satoshi Kitamura, Tamana (JP); Fuminobu Noguchi, Kumamoto (JP); Tsutomu Shikakubo, Shiki (JP)

(73) Assignee: Toppan Printing Co., Ltd., Tokyo (JP)

(21) Appl. No.: 09/313,560

(22) Filed: May 14, 1999

Related U.S. Patent Documents

Reissue of:
(64) Patent No.: 5,700,550
Issued: Dec. 23, 1997
Appl. No.: 08/361,370
Filed: Dec. 22, 1994

(30) Foreign Application Priority Data

Dec. 27, 1993 (JP) ..... 5-333541
Dec. 27, 1993 (JP) ..... 5-333543
Dec. 27, 1993 (JP) ..... 5-333544

(51) Int. Cl.[7] ..... G06K 19/16
(52) U.S. Cl. ..... 428/212; 359/1; 359/2; 359/15; 359/580; 359/584; 359/585; 359/587; 283/72; 283/85; 283/87; 283/91; 283/94; 428/469; 428/472; 428/696; 428/698; 428/699; 428/701; 428/702; 428/915; 428/408; 428/917; 428/704
(58) Field of Search ..... 428/1, 698, 212, 428/469, 472, 472.2, 699, 701, 702; 359/1, 2, 15, 580, 584, 585, 587; 283/22, 85, 87, 91, 94

(56) References Cited

U.S. PATENT DOCUMENTS 3,858,977 A 1/1975 Baird et al.
4,626,445 A * 12/1986 Drobrowolski (List continued on next page.)

FOREIGN PATENT DOCUMENTS

DE 4242407 9/1993

(List continued on next page.)

OTHER PUBLICATIONS

Robert W. Pohl, "Optik and Atomphysik", Springer–Verlag, Berlin•Heidelberg•New York, 12.Aufl., 1967, p. 75. No. Month.

Dobrowolski et al., "Research on Thin Film Anticounterfeiting Coatings at the National Research Council of Canada" *Applied Optics*, vol. 28, No. 14, Jul. 15, 1989, pp. 1–16.

*Primary Examiner*—Archene Turner
(74) *Attorney, Agent, or Firm*—Staas & Halsey LLP

(57) ABSTRACT

A hologram forming layer, transparent evaporated layer, colored layer, adhesion anchor layer, and adhesive layer are sequentially laminated on the under surface of a base member. The laminated body is used as a seal by the presence of the adhesive layer. It is preferable for the base member to have adequate rigidity (flexibility, tensile strength) and surface flatness. The hologram forming layer has a relief type hologram image. The transparent evaporated layer is a multi-layered ceramic layer constructed by alternately laminating high-refractive index layers and low-refractive index layers and the thickness thereof is preferably set to 1 $\mu$m or less. In the transparent evaporated layer, the color of visible light in predetermined wavelength range is changed according to the viewing angle when it is transmitted therethrough or reflected therefrom.

66 Claims, 16 Drawing Sheets

U.S. PATENT DOCUMENTS

| | | | | |
|---|---|---|---|---|
| 4,705,356 | A | | 11/1987 | Berning et al. |
| 4,856,857 | A | * | 8/1989 | Takeuchi et al. ..... 350/3.6 |
| 5,009,486 | A | | 4/1991 | Dobrowolski et al. |
| 5,104,471 | A | * | 4/1992 | Antes et al. |
| 5,140,464 | A | * | 8/1992 | Kyogoku |
| 5,149,386 | A | * | 9/1992 | Smits |
| 5,276,537 | A | * | 1/1994 | Savant et al. |
| 5,313,317 | A | * | 5/1994 | Saburi et al. |
| 5,383,687 | A | * | 1/1995 | Suess et al. |

FOREIGN PATENT DOCUMENTS

| | | | | |
|---|---|---|---|---|
| EP | 0 165 021 | A3 | | 12/1985 |
| EP | 0201323 | | | 11/1986 |
| EP | 0365333 | A2 | | 4/1990 |
| EP | 0401466 | | | 12/1990 |
| EP | 0420261 | | | 4/1991 |
| EP | 0531605 | A1 | | 3/1993 |
| EP | 0570120 | | | 11/1993 |
| JP | 46-4432 | | * | 2/1971 |
| JP | 61-292181 | | | 12/1986 |
| JP | 64-40878 | | | 2/1989 |
| JP | 3-7372 | | * | 2/1991 |
| JP | 4-17554 | | * | 4/1992 |
| JP | 5127586 | | | 5/1993 |
| WO | 91/18377 | | | 11/1991 |

* cited by examiner

TRANSPARENT HOLOGRAM SEAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a laminated body having an optical multi-layered film, and more particularly to a transparent hologram seal affixed to an article and used for determining the real or imitation of the article.

2. Description of the Related Art

Conventionally, in order to prevent the forgery of an article, it is considered to make the construction of the article complicated so that the article itself can be hardly imitated or permit the real to be distinguished from the imitation by affixing an accessory which can be hardly imitated to the article.

In the former case, a complicated and fine pattern may be formed in an article, for example, a stock and bond such as a bank note, the coloring with a color tone which cannot be easily imitated may be made therein, or a special material may be used as the material thereof. This makes it difficult to forge the article by imitation thereof, dishonest usage of printing technique or illegal copying by use of a copying machine.

However, with the development of the printing/copying technique or the development of the digital technology of copying machines or the like, it becomes possible to easily imitate the article even when the above fine patterning process is used or the coloring which is difficult to imitate is used, and as a result, it becomes necessary to further enhance the fine patterning technique by taking the above technique and technology into consideration so as to make the copying and forgery more difficult. Thus, the above measure in the former case does not lead to a fundamental solution.

On the other hand, in the latter case, the measure is attained by simply affixing an accessory to the article and is widely used. For example, a transparent hologram seal having an image of relief type hologram formed therein is affixed to an article such as a credit card, bank note, or certificate, for example, as the proof of the real article. The hologram seal can be produced on a large scale by forming a hologram image having an uneven surface and embossing the same. When the layer structure is taken into consideration, the seal can be formed such that it will be difficult to remove the seal or it will be difficult to use the seal again after it is removed. Thus, if the seal is affixed and then removed, at least part of the hologram is destroyed so that not only the forgery but also any modification or change of the article can be clearly recognized at a glance.

As a conventional example of the above device, a "reuse preventing certificate stamp" described in Japanese Utility Model Application KOKOKU Publication No. 46-4432 is provided. The reuse preventing certificate stamp is formed by partially or entirely coating a releasing or separating layer on the rear surface of a transparent plastic film, forming a desired printing pattern on the same and forming a pressure sensitive adhesive layer on the printing pattern.

As another conventional example, a "pressure sensitive adhesive sheet for passport" described in Japanese Utility Model Application KOKOKU Publication No. 3-7372 is provided. The pressure sensitive adhesive sheet for passport is formed by partially forming a transparent release agent layer on the rear surface of a transparent film base member, forming a print displaying section layer on the rear surface of the release agent layer and forming a transparent pressure sensitive adhesive layer which is adhered to the ground paper of the passport on the remaining portion of the rear surface of the transparent film base member and the above layers.

Further, a "re-adhesion preventing pressure sensitive adhesive sheet" described in Japanese Utility Model Application KOKOKU Publication No. 4-17554 is provided. This discloses a re-adhesion prevented pressure sensitive adhesive sheet which has a transparent inter-layer separation or release resin layer formed between a transparent film base member and a transparent pressure sensitive adhesive layer and in which an opaque print displaying section is partially formed on the lower side of the inter-layer release resin layer.

In U.S. Pat. No. 4,705,356 (Japanese Patent Application KOKAI Publication No. 61-105509), an optical discoloring thin film product having a considerable color shifting amount according to an angle and a method for forming the same are disclosed.

However, in the above-described conventional examples, there is a problem that it is difficult to determine the real or imitation of the article. Since the construction of the hologram seal is complicated, it is necessary to carefully check the article by enlarging the fine portion or comparing the article with the real article. Therefore, even when a special seal for preventing the forgery is affixed, the imitation cannot be detected if there is no sufficient room in place and sufficient time to spare.

SUMMARY OF THE INVENTION

The present invention has been made to solve the above problems and an object thereof is to provide a laminated body which is simple in construction and which can be used to easily determine the real or imitation.

Another object of the present invention is to provide a multi-layer body which is simple in construction and which can be used to easily determine the real or imitation.

According to the present invention, there is provided a laminated body comprising:

a base member;

a hologram layer formed on the base member;

a transparent evaporated layer formed on the hologram layer and constructed by a laminated structure of first and second ceramic materials having different refractive indices; and an adhesive layer formed on the transparent evaporated layer.

According to the present invention, there is provided another laminated body comprising:

a base member;

a separating layer formed on the base member;

a hologram layer formed on the separating layer;

a transparent evaporated layer formed on the hologram layer and constructed by a laminated structure of first and second ceramic materials having different refractive indices; and an adhesive layer formed on the transparent evaporated layer.

According to the present invention, there is provided a further laminated body comprising:

a base member;

a hologram layer formed on the base member;

a transparent evaporated layer formed on the hologram layer and constructed by a laminated structure of first and second ceramic materials having different refractive indices;

a separating layer formed on the transparent evaporated layer; and an adhesive layer formed on the separating layer.

According to the present invention, there is provided a still another laminated body comprising:

a base member;

a transparent evaporated layer formed on the base member and constructed by a laminated structure of first and second ceramic materials having different refractive indices; and a print layer formed on the transparent evaporated layer and having a predetermined printed pattern.

According to the present invention, there is provided a still further laminated body comprising:

a reflective base member; and a transparent evaporated layer formed on the base member and constructed by a laminated structure of first and second ceramic materials having different refractive indices.

According to the present invention, there is provided a still further laminated body comprising:

a base member;

a print layer formed on the base member and having a predetermined printed pattern; and a transparent evaporated layer formed on the print layer and constructed by a laminated structure of first and second ceramic materials having different refractive indices.

According to the present invention, there is provided a still further laminated body comprising:

a reflective base member; and a transparent evaporated layer partially formed on parts of the base member and constructed by a laminated structure of first and second ceramic materials having different refractive indices.

According to the present invention, there is provided a still further laminated body comprising:

a reflective base member; and a transparent evaporated layer partially formed on the base member and constructed by a laminated structure of first and second ceramic materials having different refractive indices, the number of the laminated structure being different on parts of the base member.

According to the present invention, there is provided a still further laminated body comprising:

a reflective base member; and a transparent evaporated layer partially formed on said base member and constructed by a laminated structure of first and second ceramic materials having different refractive indices, the thickness of the laminated structure being different on parts of said base member.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

A preferred embodiment of a laminated body according to the present invention will now be described with reference to the accompanying drawings.

[First Embodiment]

Figure 1:
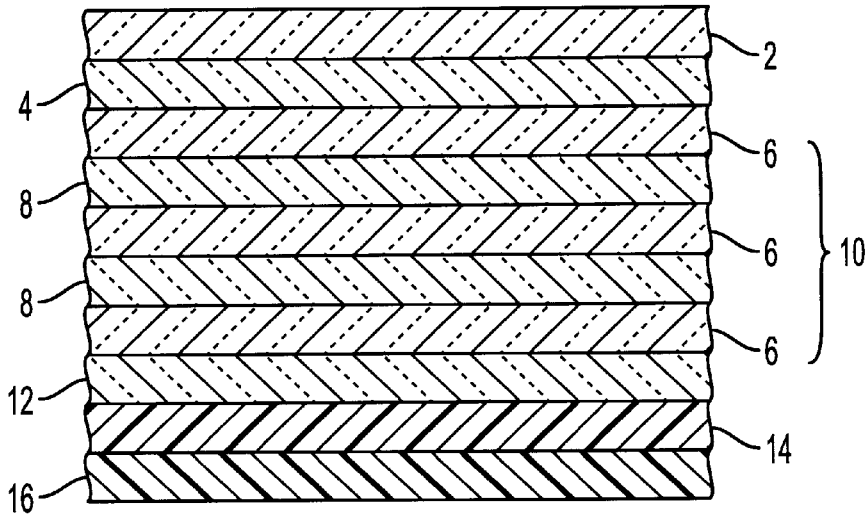
FIG. 1 is a cross sectional view showing the structure of a first embodiment of a transparent hologram seal according to the present invention.

FIG. 1 is a cross sectional view showing the structure of the first embodiment. A hologram forming layer 4, transparent evaporated layer 10, colored layer 12, adhesion anchor layer 14, and adhesive layer 16 are sequentially laminated on the under surface of a base member 2. The seal is affixed to an article by the adhesive layer 16 and can be observed from above the surface of the base member 2 (upper side in the drawing). It can be determined that the article having the seal is the real of the article and the article not having the seal is the imitation of the article.

Since the underlying layer is observed via the base member 2, the base member 2 must be made sufficiently transparent and is preferably formed to have adequate rigidity (flexibility, tensile strength) and surface flatness. For this reason, the material is not limited to a specified one, but a high polymer film such as a polyester film, or polyolefine film may be used, for example. Further, it is possible to form a printing layer such as a pattern or characters if it does not obstruct the visual observation. It is also possible to form a protection film on the base member 2 for protecting the surface. It is preferable to set the thickness of the base member 2 to such a thickness as to maintain the flexibility. A method for forming the print layer is not limitative, but since the function of the present invention cannot be attained if the print layer is formed on the entire surface of the base member, it is preferable to print only a simple pattern or characters on the base member.

The hologram forming layer 4 may be formed of thermoplastic resin such as polycarbonate resin, polystyrene resin, or polyvinyl chloride resin, thermosetting resin such as unsaturated polyester resin, melamine resin, epoxy resin, urethane (meta) acrylate, polystyrene (meta) acrylate, epoxy (meta) acrylate, polyol (meta) acrylate, melamine (meta) acrylate, or triazine (meta) acrylate, a combination of the above materials, or thermoforming resin having a radical polymerization unsaturated radical. Any of the above materials can be used if it can be used to stably form a hologram image. As the hologram image, a relief type hologram image having an image formed of a fine uneven surface is used, but it is not limitative.

By adequately selecting the material, it is possible to combine the base member 2 and the hologram forming layer 4 into a single layer.

The transparent evaporated layer 10 is a multi-layered (in this example, five-layered) ceramic layer formed by alternately laminating high-refractive index layers 6 and low-refractive index layers 8. For example, as the material of the low-refractive index layer 8, magnesium oxide (refractive index n=1.6), silicon dioxide (refractive index n=1.5), magnesium fluoride (refractive index n=1.4), calcium fluoride (refractive index n=1.3 to 1.4), cerium fluoride (refractive index n=1.6), aluminum fluoride (refractive index n=1.3), or aluminum oxide (refractive index n=1.6) is used, and as the material of the high-refractive index layer 6, titanium dioxide (refractive index n=2.4), zirconium dioxide (refractive index n=2.0), zinc sulfide (refractive index n=2.3), zinc oxide (refractive index n=2.1), indium oxide (refractive index n=2.0), cerium dioxide (refractive index n=2.3), or tantalum oxide (refractive index n=2.1) is used. The material and the number of laminated layers are not limitative.

The transparent evaporated layer 10 may be formed by means of any film-forming method if the thickness of the film can be controlled. Since a dry type method is superior, a physical vapor-deposition method such as a spattering or a chemical vapor-deposition method can be used. It is desired that the thickness of the transparent evaporated layer 10 is not greater than 1 $\mu$m. If the thickness is greater than 1 $\mu$m, the flexibility is degraded and a crack may be appeared in the layer.

Since the hologram forming layer 4 is an organic polymer having a low-refractive index layer, it is desired that the layer below the hologram forming layer 4 is high-refractive index layer 6.

The optical path length in the transparent evaporated layer 10 is changed if an angle at which it is viewed is changed when a visible light ray of specified wavelength range is transmitted or reflected, and the transmission light or reflected light is observed as a light of different color. Therefore, even when the seal is superficially forged, it is easy to determine the real or imitation by observing a change in color caused by changing the viewing angle. In general, the spectral characteristic varies depending on the number of layers of the evaporated layer 10.

As one example of the colored layer 12, a colored layer colored by use of ceramic or colored transparent ink is provided. Since the color change can be variously attained and can be easily observed by providing the colored layer 12, it becomes easier to detect the forgery.

The adhesion anchor layer 14 is provided to attain the stable adhesion of the colored layer 12 to the adhesive layer 16. The adhesion anchor layer 14 may be formed of any material if it does not change the quality of the transparent evaporated layer 10 or erode the layer. For example, epoxy resin may be used.

The colored layer 12 and the adhesion anchor layer 14 are not necessarily provided.

As the adhesive layer 16, an adhesive agent usually used can be used if it does not change the quality of the transparent evaporated layer 10 or erode the layer. For example, vinyl chloride-vinyl acetate copolymer, acrylic-series adhesive agent, polyester-series polyamide or the like can be used.

Next, the results of measurements of variations in visible spectra of the transparent hologram seals with the above structure according to the present invention and hologram seals used for comparison measured by use of an invisible/visible spectrophotometer are shown.

(Experiment 11)

The base member 2: a polyester film with a thickness of 12 μm;

The low-refractive index layer 8 of the evaporated layer 10: magnesium fluoride;

The high-refractive index layer 6 of the evaporated layer 10: zinc sulfide;

The number of layers of the layer 10: 5;

The film thickness of the layer 10: 1 μm.

(Experiment 12)

The base member 2: a polyester film with a thickness of 12 μm;

The low-refractive index layer 8: silicon dioxide;

The high-refractive index layer 6: titanium dioxide;

The number of layers of the layer 10: 5;

The thickness of the layer 10: 1 μm.

(Experiment 13)

The base member 2: a polyester film with a thickness of 12 μm;

The low-refractive index layer 8: silicon dioxide;

The high-refractive index layer 6: zirconium dioxide;

The number of the layers of the layer 10: 5;

The thickness of the layers of the layer 10: 1 μm.

(Experiment 14)

The base member 2: a polyester film with a thickness of 12 μm;

The low-refractive index layer 8: magnesium fluoride;

The high-refractive index layer 6: zinc sulfide;

The number of the layers of the layer 10: 5;

The thickness of the layer 10: 1 μm.

(Comparison Example 11)

The base member 2: a polyester film with a thickness of 12 μm;

The low-refractive index layer 8: magnesium fluoride;

The high-refractive index layer 6: zinc sulfide;

The number of layers of the layer 10: 3;

The thickness of the layer 10: 1 μm.

(Comparison Example 12)

The base member 2: a polyester film with a thickness of 12 μm;

The low-refractive index layer 8: magnesium fluoride;

The high-refractive index layer 6: zinc sulfide;

The number of the layers of the layer 10: 7;

The thickness of the layer 10: 1 μm.

Color changes of the reflected light caused when a visible light ray is made incident on the hologram seals of the above experiments and comparison examples and the incident direction is changed from the right angles to 45 degrees are shown in the following tables 1 and 2.

TABLE 1

| Ex. | First Layer | Second Layer | Third Layer | Fourth Layer | Fifth Layer | Color Change |
|---|---|---|---|---|---|---|
| 1 | ZnS | $MgF_2$ | ZnS | $MgF_2$ | ZnS | GOOD |
| 2 | $TiO_2$ | $SiO_2$ | $TiO_2$ | $SiO_2$ | $TiO_2$ | GOOD |
| 3 | $ZrO_2$ | $SiO_2$ | $ZrO_2$ | $SiO_2$ | $ZrO_2$ | GOOD |
| 4 | $TiO_2$ | $MgF_3$ | $TiO_2$ | $MgF_2$ | $TiO_2$ | GOOD |

TABLE 2

| Comp. Ex. | First Layer | Second Layer | Third Layer | Fourth Layer | Fifth Layer | Sixth Layer | Seventh Layer | Color Change |
|---|---|---|---|---|---|---|---|---|
| 1 | ZnS | $MgF_2$ | ZnS | | | | | POOR |
| 2 | ZnS | $MgF_2$ | ZnS | $MgF_2$ | ZnS | $MgF_2$ | ZnS | GOOD |

Figure 2:
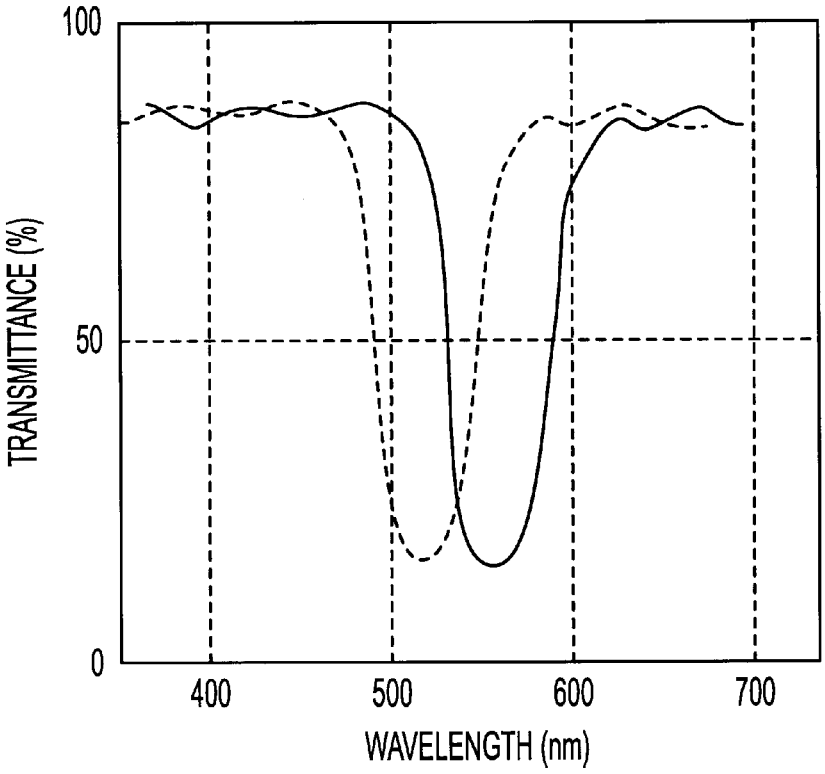
FIG. 2 shows a variation in the visible spectrum of an experiment example of the first embodiment.

FIG. 2 shows a variation in the visible spectrum of the experiment example 11. The central wavelength of absorption of visible light incident at right angles was 550 nm, and the spectrum obtained when the visible light was made incident in an oblique direction at an angle of 45 degrees was shifted towards the short-wavelength side as indicated by broken lines and a color change occurred.

Also, in the experiment examples 12 to 14, the central wavelength of absorption of visible light incident at right angles was 550 nm, and the spectrum obtained when the visible light was made incident in an oblique direction at an angle of 45 degrees was shifted towards the short-wavelength side and a color change occurred, as illustrated in FIG. 2. The absorption level varies in accordance with the material of the transparent evaporated layer 10.

Figure 3:
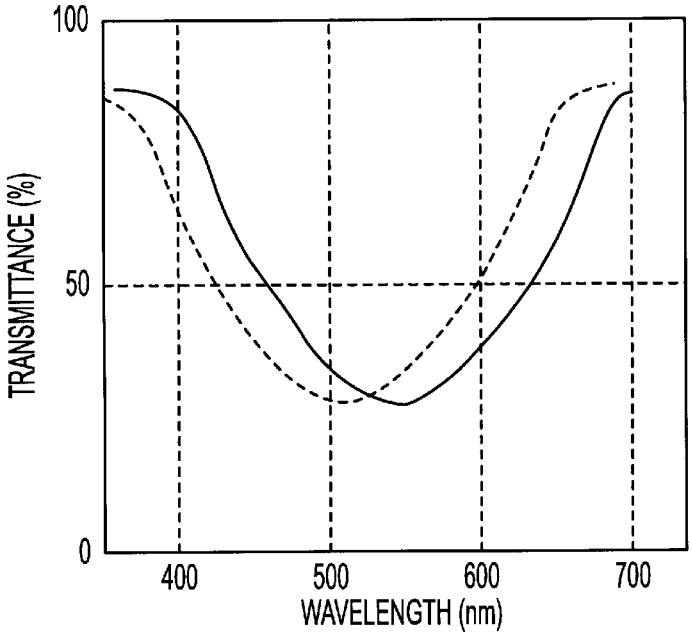
FIG. 3 shows a variation in the visible spectrum of a comparison example of the first embodiment.

FIG. 3 shows a variation in the visible spectrum of the comparison example 11. The central wavelength of absorption of visible light incident at right angles was 550 nm, and the spectrum obtained when the visible light was made incident in an oblique direction at an angle of 45 degrees was shifted towards the short-wavelength side as indicated by broken lines but a clear color change did not occur since the half-width value of the spectrum is broad.

As described above, according to the first embodiment, the transparent hologram seal is formed by laminating the hologram forming layer, transparent evaporated layer, and adhesive layer on the base member, and when required, further laminating the colored layer and adhesion anchor layer on the base member and exhibits the property that a light of specified wavelength range is reflected or transmitted by forming the transparent evaporated layer by laminating a plurality of layers of ceramic material having different refractive indices to a specified thickness, and since the film thickness is changed according to a viewing angle, the optical path length in the thin film is changed and the transmission light or reflected light is observed as a light of different color. Therefore, it is possible to easily determine the real or imitation of the seal according to whether or not the color is changed by changing the viewing angle.

Next, other embodiments will be explained. In the explanation of the other embodiments, portions which are the same as those of the first embodiment are denoted by the same reference numerals and the explanation therefor is omitted.

[Second Embodiment]

Figure 4:
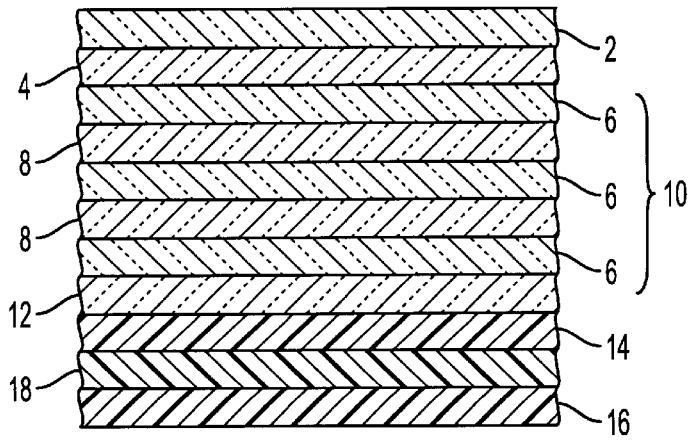
FIG. 4 is a cross sectional view showing one structure of a second embodiment of a transparent hologram seal according to the present invention.

FIG. 4 is a cross sectional view showing the structure of the second embodiment. A hologram forming layer 4, transparent evaporated layer 10, cooled layer 12, adhesion anchor layer 14, separating or releasing layer 18, and adhesive layer 16 are sequentially laminated on the under surface of a base member 2. Also, in the second embodiment, the colored layer and adhesion anchor layer may be omitted. The adhesive strength of the separating or releasing layer 18 must be set smaller than that of the adhesive layer 16 with respect to a to-be-affixed object to which the seal is affixed, for example, paper or plastic, and may be formed of any material if it satisfies the above condition and has sufficient stability in the succeeding processes. It may be an organic material or inorganic material. For example, thermoplastic acryl resin, chlorinated rubber-series resin, vinyl chloride-vinyl acetate copolymer, cellulosic resin, chlorinated polypropylene, or the above material to which oil silicon, fatty acid amide, or zinc stearate is added may be preferably used. Therefore, the adhesive strength of the adhesive layer may be set larger than that of the releasing layer in a releasing portion (a portion to be left on the to-be-affixed object) and adhesion of the transparent evaporated layer to the base member must be high in a portion to be left on the base member.

The releasing layer 18 is not uniformly formed on the entire surface, but is formed in a predetermined pattern form. The pattern may be of any form if it can be visually determined, and a specified pattern, mark, characters can be used. The pattern can be formed by use of conventionally known printing means such as gravure or coating means and can be freely selected according to the application.

Figure 5:
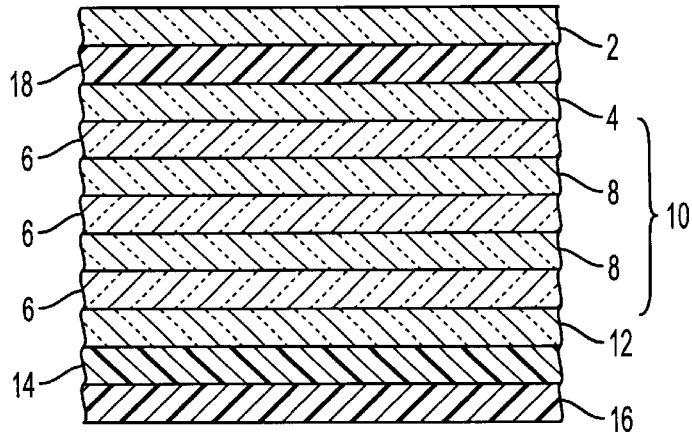
FIG. 5 is a cross sectional view showing another structure of the second embodiment.

The second embodiment is an embodiment relating to a brittle seal which cannot be used again after it is separated, the position of the releasing layer 18 is not limited to the position of FIG. 4 and the releasing layer 18 may be arranged between the base member 2 and the hologram forming layer 4 as shown in FIG. 5. Further, the releasing layer 18 may be arranged between the hologram forming layer 4 and the transparent evaporated layer 10, between the transparent evaporated layer 10 and the colored layer 12, or between the colored layer 12 and the adhesion anchor layer 14.

Figure 6:
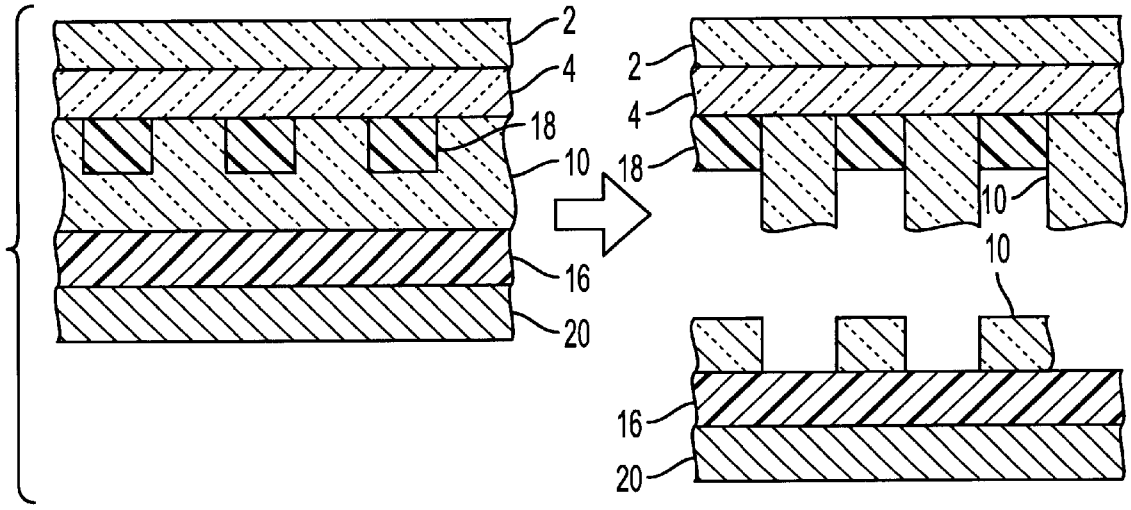
FIG. 6 shows the state before and after the separation of the brittle seal of the second embodiment.

The state before and after the separation is shown in FIG. 6. FIG. 6 shows an example in which the separation or releasing layer 18 in a patterned form is arranged between the hologram forming layer 4 and the transparent evaporated layer 10. In FIG. 6, for the sake of simplification, a protection layer, adhesion anchor layer, printing layer, and colored layer are not shown and the evaporated layer 10 is not shown by a combination of a low-refractive index layer and a high-refractive index layer.

After the adhesion layer 16 is affixed to a to-be-affixed object 20, the evaporated layer 10 is broken when the seal is separated from the to-be-affixed object 20. A part of the evaporated layer 10 which corresponds to the patterned separation or releasing layer 18 is left on the to-be-affixed object 20 (the adhesion layer 16) and the remainder portion of the evaporated layer 10 on which the patterned separation or releasing layer 18 is not formed is affixed to the hologram forming layer 4. As a result, the hologram seal cannot be reused or re-affixed after it is pealed from the to-be-affixed object, thereby preventing an illegal use of the seal.

Next, the results of measurements of variations in visible spectra of the transparent hologram seals with the above structure according to the present invention and hologram seals used for comparison measured by use of an invisible/visible spectrophotometer are shown.

(Experiment 21)

The base member 2: a polyester film with a thickness of 12 μm;

The releasing layer 18: thermoplastic acryl resin having oil silicon added thereto (the releasing layer is formed in a pattern form by gravure);

The low-refractive index layer: magnesium fluoride;

The high-refractive index layer: zinc sulfide;

The number of the layers of the layer 10: 5;

The thickness of the layer 10: 1 μm.

(Experiment 22)

The base member 2: a polyester film with a thickness of 12 μm;

The releasing layer 18: thermoplastic acryl resin having oil silicon added thereto (the releasing layer is formed in a pattern form by gravure);

The low-refractive index layer: magnesium fluoride;

The high-refractive index layer: zinc sulfide;

The number of the layers of the layer 10: 7;

The thickness of the layer 10: 1 μm.

(Comparison Example 21)

The base member: a polyester film with a thickness of 12 μm;

The releasing layer: thermoplastic acryl resin having oil silicon added thereto (the releasing layer is formed in a pattern form by gravure);

The low-refractive index layer: magnesium fluoride;

The high-refractive index layer: zinc sulfide;

The number of layers of the layer 10: 3;

The thickness of the layer 10: 1 μm.

(Comparison Example 22)

The base member: a polyester film with a thickness of 12 μm;

The releasing layer: thermoplastic acryl resin having oil silicon added thereto (the releasing layer is formed in a pattern form by gravure);

The low-refractive index layer: magnesium fluoride;

The high-refractive index layer: zinc sulfide;

The number of the layers of the layer 10: 7;

The thickness of the layer 10: 1 μm.

Color changes of the reflected light caused when a visible light ray is made incident on the hologram seals of the above experiments and the comparison examples used in the first embodiment and the incident direction is changed from the right angles to 45 degrees are shown in the following tables 3 and 4.

TABLE 3

| Comp. Ex. | First Layer | Second Layer | Third Layer | Fourth Layer | Fifth Layer | Sixth Layer | Seventh Layer | Color Change | Brinleness |
|---|---|---|---|---|---|---|---|---|---|
| 5 | ZnS | $MgF_2$ | ZnS | $MgF_2$ | ZnS | | | GOOD | GOOD |
| 6 | ZnS | $MgF_2$ | ZnS | $MgF_2$ | ZnS | $MgF_2$ | ZnS | GOOD | GOOD |

TABLE 4

| Comp. Ex. | First Layer | Second Layer | Third Layer | Fourth Layer | Fifth Layer | Sixth Layer | Seventh Layer | Color Change | Brinleness |
|---|---|---|---|---|---|---|---|---|---|
| 21 | ZnS | $MgF_2$ | ZnS | | | | | POOR | GOOD |
| 22 | ZnS | $MgF_2$ | ZnS | $MgF_2$ | ZnS | $MgF_2$ | ZnS | GOOD | POOR |

Figure 7:
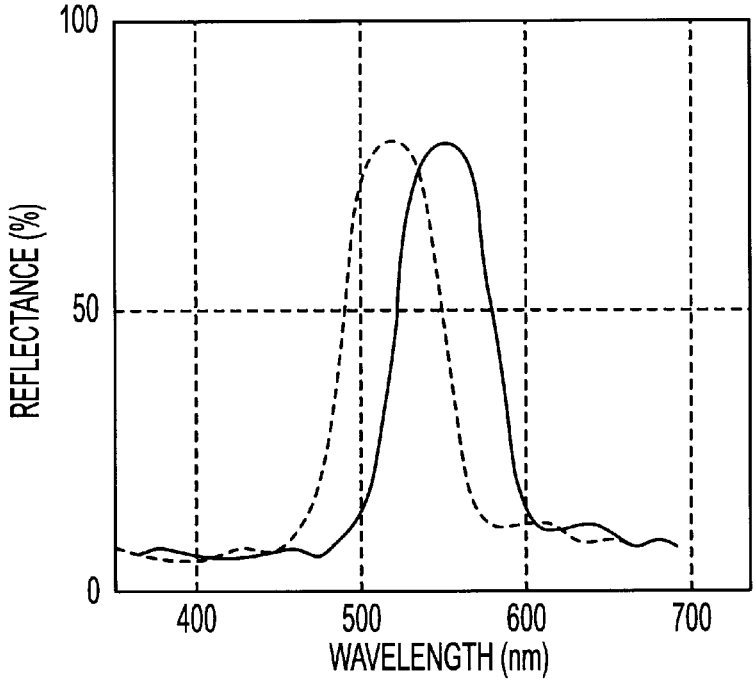
FIG. 7 shows a variation in the visible spectrum of an experiment example of the second embodiment.

FIG. 7 shows a variation in the visible spectrum of the experiment 21. The central wavelength of absorption of visible light incident at right angles was 550 nm, and the spectrum obtained when the visible light was made incident in an oblique direction at an angle of 45 degrees was shifted towards the short-wavelength side as indicated by broken lines and a color change occurred.

Also, in the experiment 22, the central wavelength of absorption of visible light incident at right angles was 550 nm, and the spectrum obtained when the visible light was made incident in an oblique direction at an angle of 45 degrees was shifted towards the short-wavelength side and a color change occurred.

As already explained with reference to FIG. 3, in the visible spectrum of the comparison example 21, the central wavelength of absorption of visible light incident at right angles was 550 nm, and the spectrum obtained when the visible light was made incident in an oblique direction at an angle of 45 degrees was shifted towards the short-wavelength side, but a clear color change did not occur.

Further, since the seal of the comparison example 22 had a large number of layers, the strength of adhesion of the transparent evaporated layer to the base member was weak and cracks occurred in the transparent evaporated layer when it was bent.

As described above, according to this embodiment, the hologram seal is formed by laminating the hologram forming layer, transparent evaporated layer, and adhesive layer on the base member, and when required, further laminating the colored layer and adhesion anchor layer on the base member and exhibits the property of permitting a light of specified wavelength range to be reflected or transmitted by forming the transparent evaporated layer by laminating a plurality of layers of ceramic material having different refractive indices to a specified thickness, and since the film thickness is changed according to a viewing angle, the optical path length in the thin film is changed and the transmission light or reflected light is observed as a light of different color. As a result, since the color looks different, it is possible to easily determine the real or imitation of the seal, thus providing an extremely highly reliable forgery preventing effect. Further, since the releasing layer whose adhesion strength is weaker than that of the adhesion layer for affixing the seal to the to-be-affixed object and the seal is divided into two portions along the releasing layer when the seal is separated from the object, the seal cannot be used again.

[Third Embodiment]

Figure 8:
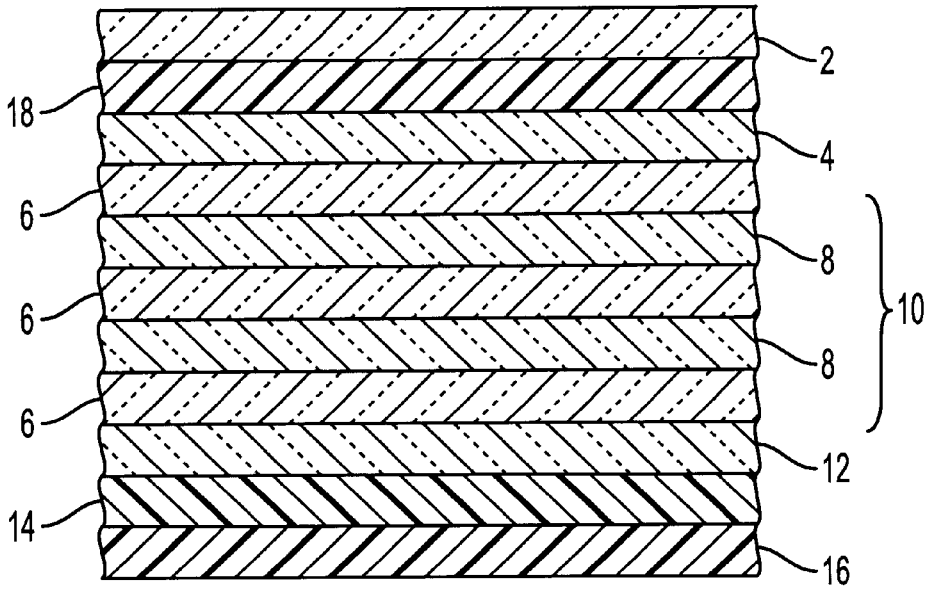
FIG. 8 is a cross sectional view showing the structure of a third embodiment of a transparent hologram transfer foil according to the present invention.

FIG. 8 is a cross sectional view showing a transparent hologram transfer foil according to a third embodiment. The hologram transfer foil is similar to the brittle hologram seal. However, the separating or releasing layer 18 can be freely arranged in the case of the brittle hologram seal but it must be arranged below the base member in the case of the hologram transfer foil.

A hologram forming layer 4, transparent evaporated layer 10, colored layer 12, adhesion anchor layer 14, separating or releasing layer 18, and adhesive layer 16 are sequentially laminated on the under surface of a base member 2. Also, in the third embodiment, the colored layer and adhesion anchor layer may be omitted. Further, in order to protect the hologram forming layer 4 after transfer, a transparent protection layer may be provided between the releasing layer 18 and the hologram forming layer 4. As the protection layer, plastic such as polyolefine, polyvinyl chloride, polyvinylidene chloride, polyvinyl alcohol, or polyethylene terephthalate may be used.

After the adhesion layer 16 is affixed to a to-be-affixed object, only the base member 2 is separated and the layers under the hologram forming layer 4 are left on the to-be-affixed object when the seal is pealed from the to-be-affixed object.

The releasing layer 18 can be uniformly formed on the entire surface or formed in a predetermined pattern form in the same manner as in the case of the brittle hologram seal. An embodiment in which the patterned releasing layer is formed will be described next.

[Fourth Embodiment]

Figure 10:
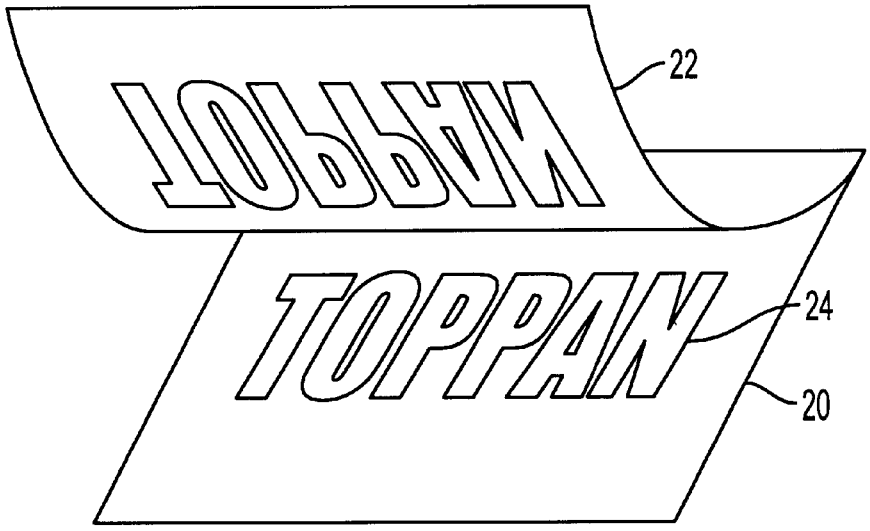
FIG. 10 shows a pattern for detection of forgery of the third embodiment.
Figure 9A:
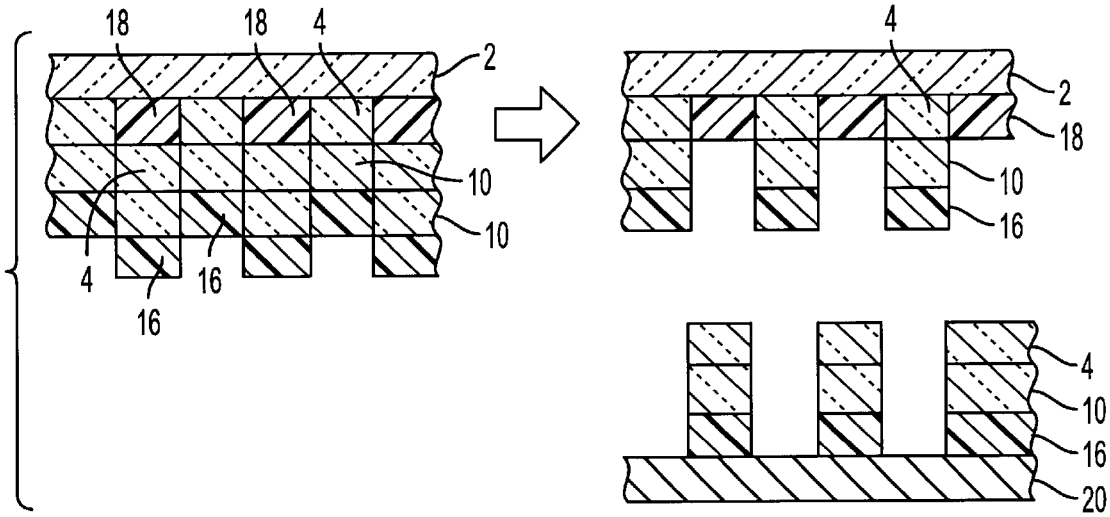
FIGS. 9A and 9B show the state before and after the transfer of the hologram transfer foil of the third embodiment.
Figure 9B:
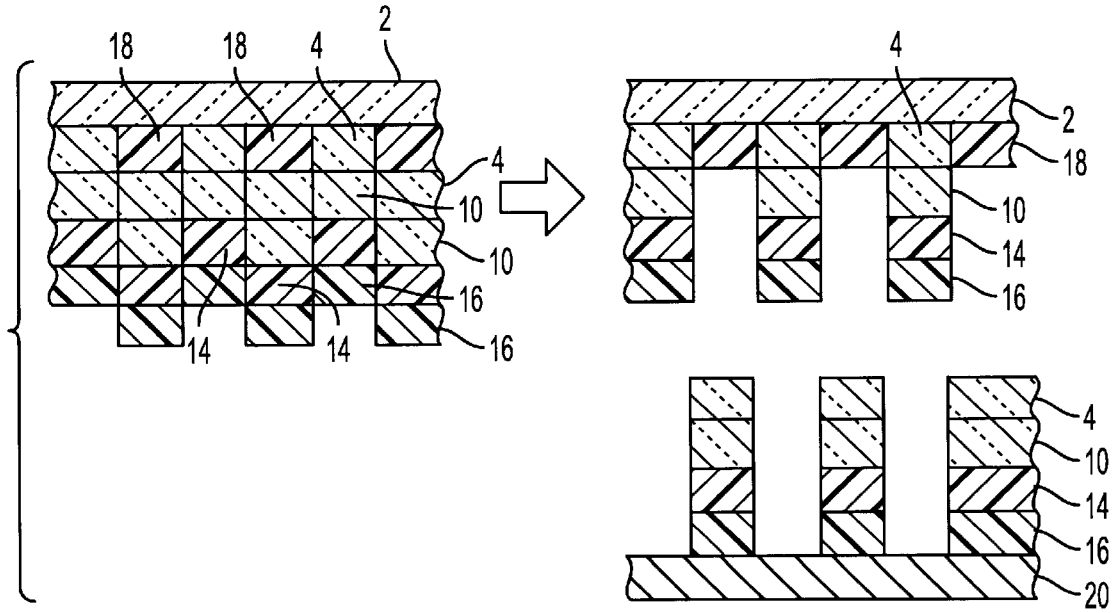

FIG. 9A shows the structure of a transfer foil according to a fourth embodiment and the state thereof before and after transfer. A base member 2, a releasing layer 18 having a pattern formed therein, a hologram forming layer 4, a transparent evaporated layer 10, and an adhesive layer 16 are sequentially laminated. Also, an adhesion anchor layer 14 can be formed between the transparent evaporated layer 10 and the adhesive layer 16 as shown in FIG. 9B. Further, although not shown in the drawing, a colored layer can be formed as in the case of the above embodiments. By forming the releasing layer 18 in the pattern form, only a portion formed on the releasing layer 18 can be transferred to a to-be-transferred object 20 when a transparent hologram transfer foil 22 is pressed against the object 22 as shown in FIG. 10, and only those portions of the hologram forming layer 4, transparent evaporated layer 10 and adhesive layer 16 which are constructed in the pattern form are formed on the object 20, thus forming a pattern 24 for detection of forgery.

Figure 11A:
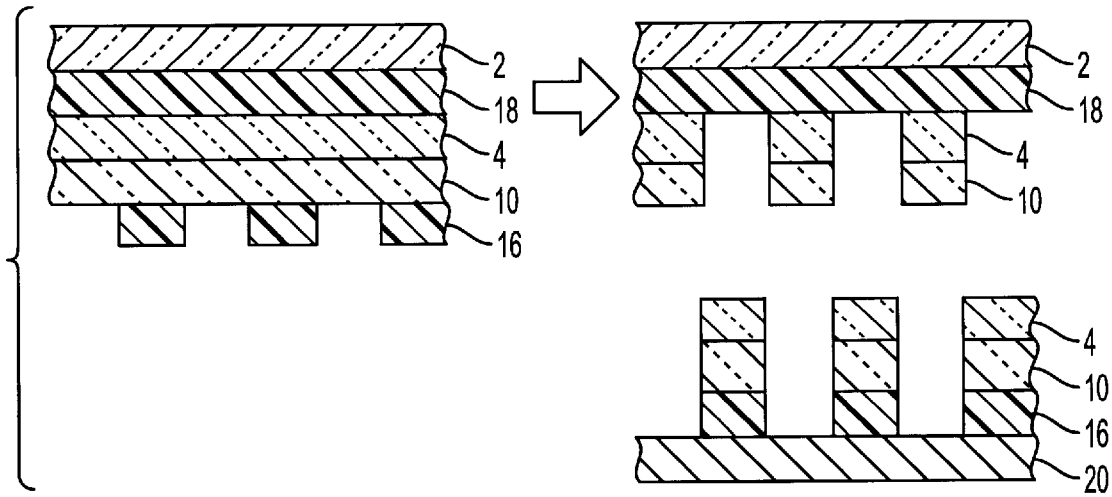
FIGS. 11A and 11B show a modification of the fourth embodiment.
Figure 11B:
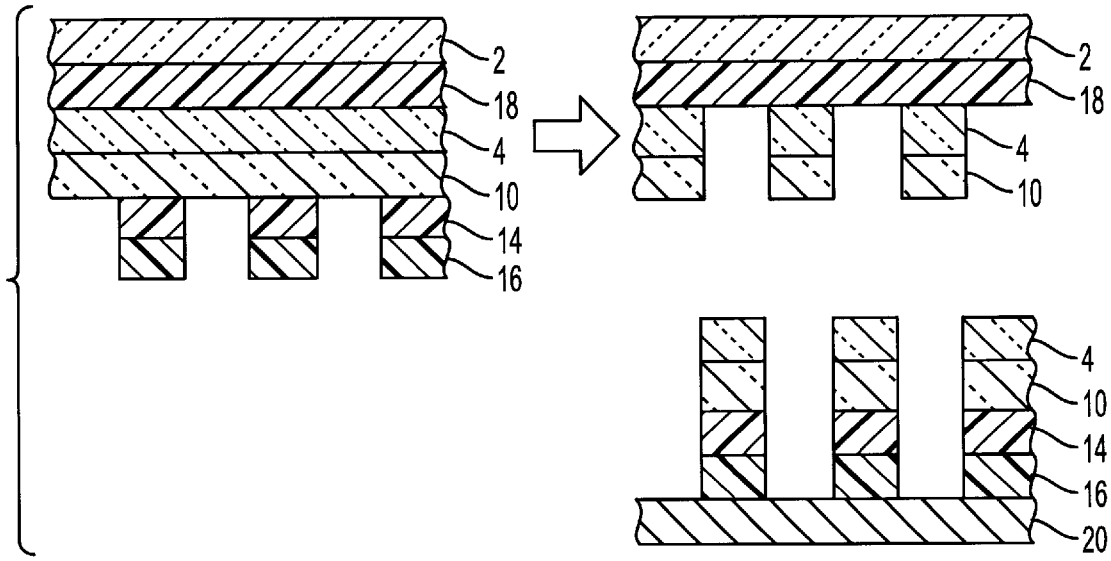

The fourth embodiment may be modified as shown in FIGS. 11A and 11B.

In the modification shown in FIG. 11A, a base member 2, a releasing layer 18, a hologram forming layer 4, a transparent evaporated layer 10, and an adhesive layer 16 having a pattern formed therein are sequentially laminated. Also, an adhesion anchor layer 14 can be formed between the transparent evaporated layer 10 and the adhesive layer 16 as shown in FIG. 11B. Further, although not shown in the drawing, a colored layer can be formed as in the case of the above embodiment. By forming the adhesive layer 16 in the pattern form, only a portion formed on the adhesive layer 18 can be transferred to a to-be-transferred object 20 when a transparent hologram transfer foil 22 is pressed against the object 22 as shown in FIG. 10, and only those portions of the hologram forming layer 4, transparent evaporated layer 10 and adhesive layer 16 which are constructed in the pattern form are formed on the object 20, thus forming a pattern 24 for detection of forgery.

Next, the results of measurements of variations in visible spectra of the transparent hologram seals with the above structure according to the present invention and hologram seals used for comparison measured by use of an invisible/visible spectrophotometer are shown.

(Experiment 41)

The base member 2: a polyester film with a thickness of 12 $\mu$m;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: silicon dioxide;

The high-refractive index layer 6: zinc sulfide;

The number of the layers of the layer 10: 5;

The thickness of the layer 10: 1 $\mu$m.

(Experiment 42)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: silicon dioxide;

The high-refractive index layer 6: titanium dioxide;

The number of the layers of the layer 10: 5;

The thickness of the layer 10: 1 μm.

(Experiment 43)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: silicon dioxide;

The high-refractive index layer 6: zirconium dioxide;

The number of the layers of the layer 10: 5;

The thickness of the layer 10: 1 μm.

(Experiment 44)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: magnesium fluoride;

The high-refractive index layer 6: zinc sulfide;

The number of the layers of the layer 10: 5;

The thickness of the layer 10: 1 μm.

(Experiment 45)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: magnesium fluoride;

The high-refractive index layer 6: titanium dioxide;

The number of the layers of the layer 10: 5;

The thickness of the layer 10: 1 μm.

(Experiment 46)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: magnesium fluoride;

The high-refractive index layer 6: zirconium dioxide;

The number of the layers of the layer 10: 5;

The thickness of the layer 10: 1 μm.

(Experiment 47)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: magnesium oxide;

The high-refractive index layer 6: zinc sulfide;

The number of the layers of the layer 10: 5;

The thickness of the layer 10: 1 μm.

(Experiment 48)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: magnesium oxide;

The high-refractive index layer 6: titanium dioxide;

The number of the layers of the layer 10: 5;

The thickness of the layer 10: 1 μm.

(Experiment 49)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: magnesium oxide;

The high-refractive index layer 6: zirconium dioxide;

The number of the layers of the layer 10: 5;

The thickness of the layer 10: 1 μm.

(Experiment 50)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: magnesium fluoride;

The high-refractive index layer 6: titanium dioxide;

The number of the layers of the layer 10: 5;

The thickness of the layer 10: 1 μm;

The colored layer: formed.

(Experiment 51)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: magnesium fluoride;

The high-refractive index layer 6: zirconium dioxide;

The number of the layers of the layer 10: 5;

The thickness of the layer 10: 1 μm.

(Experiment 52)

The base member 2: a polyester film with a thickness of 12 μm;

The releasing layer 18: thermoplastic acryl resin having oil silicon added thereto (the releasing layer is formed in a pattern form by gravure);

The hologram forming layer 4: urethane meta-acrylate resin;

The low-refractive index layer 8: magnesium fluoride;

The high-refractive index layer 6: zirconium dioxide;

The number of the layers of the layer 10: 5;

The thickness of the layer 10: 1 μm.

(Comparison Example 41)

The base member: a polyester film with a thickness of 12 μm;

The releasing layer: thermoplastic acryl resin having oil silicon added thereto (the releasing layer is formed in a pattern form by gravure);

The hologram forming layer: urethane meta-acrylate resin;

The low-refractive index layer: magnesium fluoride;

The high-refractive index layer: titanium dioxide;

The number of the layers of the evaporated layer: 3;

The thickness of the evaporated layer: 1 μm.

(Comparison Example 42)

The base member: a polyester film with a thickness of 12 μm;

The releasing layer thermoplastic acryl resin having oil silicon added thereto (the releasing layer is formed in a pattern form by gravure);

The hologram forming layer urethane mete-acrylate resin;

The low-refractive index layer magnesium fluoride;

The high-refractive index layer titanium dioxide;

The number of the layers of the evaporated layer 7;

The thickness of the evaporated layer 1 μm.

Color changes of the reflected light caused when a visible light ray is made incident on the hologram seals of the above experiments and the comparison examples used is the first embodiment and the incident direction is changed from tire right angles to 45 degrees are shown in the following tables 5 and 6.

TABLE 5

| Ex. | First Layer | Second Layer | Third Layer | Fourth Layer | Fifth Layer | Sixth Layer | Seventh Layer | Color Change | Transferability |
|---|---|---|---|---|---|---|---|---|---|
| 41 | ZnS | $SiO_2$ | ZnS | $SiO_2$ | ZnS | | | GOOD | HIGH |
| 42 | $TiO_2$ | $SiO_2$ | $TiO_2$ | $SiO_2$ | $TiO_2$ | | | GOOD | HIGH |
| 43 | $ZrO_2$ | $SiO_2$ | $ZrO_2$ | $SiO_2$ | $ZrO_2$ | | | GOOD | HIGH |
| 44 | ZnS | $MgF_2$ | ZnS | $MgF_2$ | ZnS | | | GOOD | HIGH |
| 45 | $TiO_2$ | $SiO_2$ | $TiO_2$ | $SiO_2$ | $TiO_2$ | | | GOOD | HIGH |
| 46 | $ZrO_2$ | $MgF_2$ | $ZrO_2$ | $MgF_2$ | $ZrO_2$ | | | GOOD | HIGH |
| 47 | ZnS | MgO | ZnS | MgO | ZnS | | | GOOD | HIGH |
| 48 | $TiO_2$ | MgO | $TiO_2$ | MgO | $TiO_2$ | | | GOOD | HIGH |
| 49 | $ZrO_2$ | MgO | $ZrO_2$ | MgO | $ZrO_2$ | | | GOOD | HIGH |
| 50 | $TiO_2$ | $MgF_2$ | $TiO_2$ | $MgF_2$ | $TiO_2$ | colored | | GOOD | HIGH |
| 51 | $TiO_2$ | $MgF_2$ | $TiO_2$ | $MgF_2$ | $TiO_2$ | | | GOOD | HIGH |
| 52 | $TiO_2$ | $MgF_2$ | $TiO_2$ | $MgF_2$ | $TiO_2$ | | | GOOD | HIGH |

TABLE 6

| Co Ex. | First Layer | Second Layer | Third Layer | Fourth Layer | Fifth Layer | Sixth Layer | Seventh Layer | Color Change | Transferability |
|---|---|---|---|---|---|---|---|---|---|
| 41 | $TiO_2$ | $MgF_2$ | $TiO_2$ | | | | | POOR | HIGH |
| 42 | $TiO_2$ | $MgF_2$ | $TiO_2$ | $MgF_2$ | $TiO_2$ | $MgF_2$ | $TiO_2$ | GOOD | LOW |

Figure 12:
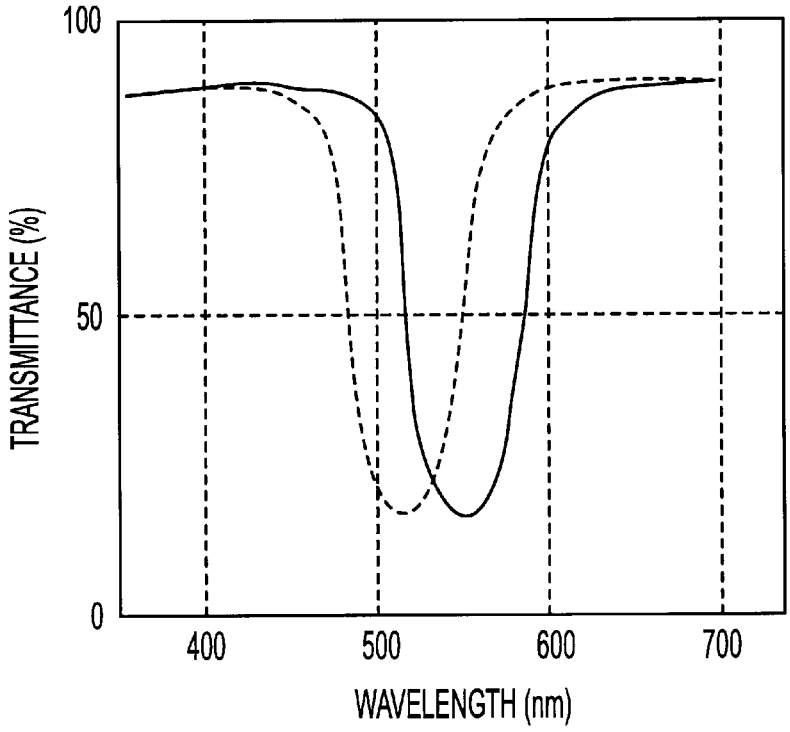
FIG. 12 shows a variation in the visible spectrum of an experiment example of the fourth embodiment.

FIG. 12 shows the visible spectrum of the experiment 41. The central wavelength of absorption of visible light incident at right angles was 550 nm, and the spectrum obtained when the visible light was made incident in an oblique direction at an angle of 45 degrees was shifted towards the short-wavelength aide as indicated by broken lines and a polar change occurred. Further, the transferability was high.

Also, as is the case of the experiment 41, in each of the experiments 42 to 49, 51 and 52, the central wavelength of absorption of visible light incident at right angles was 550 nm, and the spectrum obtained when the visible light was made incident in as oblique direction at an angle of 45 degrees was shifted towards the short-wavelength side and a color change occurred. Further, the transferability was high.

Figure 13:
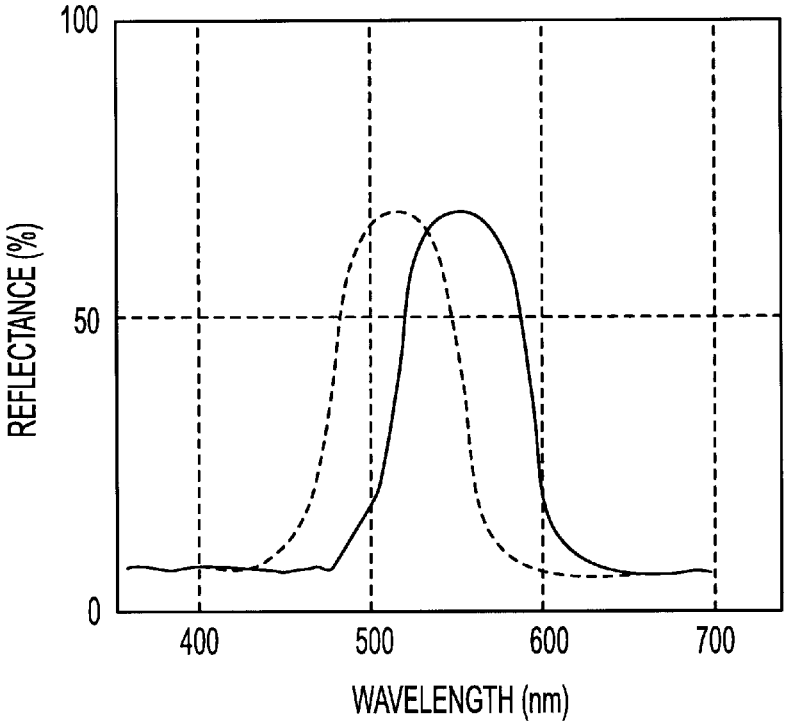
FIG. 13 shows a variation in the visible spectrum of another experiment example of the fourth embodiment.

FIG. 13 shows the visible spectrum of the experiment 50. The central wavelength of absorption of visible light incident at right angles was 550 nm, and the spectrum obtained when the visible light was made incident in an oblique direction at as angle of 45 degrees was shifted towards the short-wavelength side as indicated by broken lines and a color change occurred. Further, the transferability was high.

Figure 14:
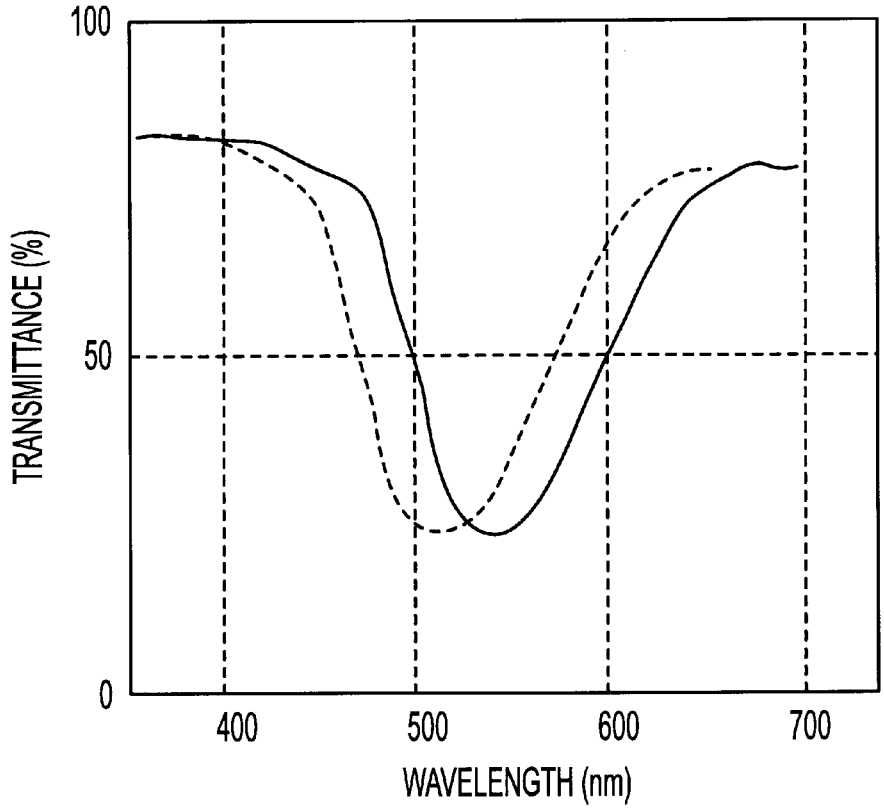
FIG. 14 shows a variation in the visible spectrum of a comparison example of the first embodiment.

As shown in FIG. 14, in the visible spectrum of the comparison example 41, the central wavelength of absorption of visible light incident at right angles was 550 nm, and the spectrum obtained when the visible light was made incident in as oblique direction at an angle of 45 degrees was shifted towards the short-wavelength side as indicated by broken lines and the color change was not clear. Further, the strength of adhesion to the to-be-affixed object was high.

Further, since the seal of the comparison example 42 had a large number of layers, the strength of adhesion of the transparent evaporated layer to the base member was weak and cracks occurred in the transparent evaporated layer when it was partly transferred or bent.

As described above, like the above embodiment, according to this embodiment, the hologram seal exhibits the property of permitting a light of specified wavelength range to be reflected or transmitted, and since the film thickness is changed according to a viewing angle, the optical path length in the thin film is changed and the transmission light or reflected light in observed as a light of different color. As a result, since the color looks different, it is possible to easily determine the real or imitation of the seal, thus providing an extremely highly reliable forgery preventing effect. Further, since the seal is formed as the transfer foil, it can be easily transferred to a three-dimensional object such as a compact.

[Fifth Embodiment]

Figure 15:
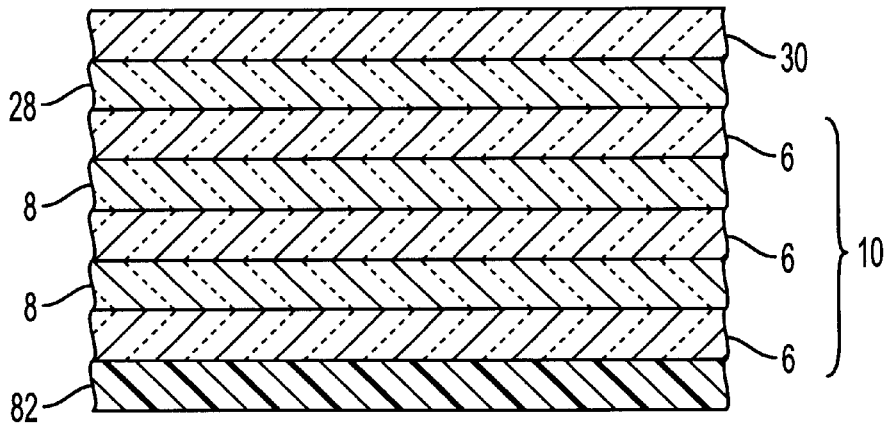
FIG. 15 is a cross sectional view showing the structure of a fifth embodiment of a laminated body according to the present invention.

FIG. 15 is a cross sectional view showing the structure of the fifth embodiment. A transparent evaporated layer 10, print layer 28 and protection layer 30 are sequentially laminated on a base member 82. The above embodiments relate to the transparent hologram seal or hologram transfer foil attached to another article, but in this embodiment, no hologram is used and the print layer 28 formed in the pattern form is used. Further this embodiment has no adhesive layer and relates to a laminated body for real article verification provided as a single unit. However, if the base member 82 is affixed to the surface of an article, this embodiment becomes the same as the above embodiments. The protection layer 30 is used to protect the whole portion of the laminated body and is required to glue no optical influence The protection layer 30 exhibits the light transmission property for light in the specified wavelength range, and in formed of resin or the like having good abrasion resistance to provide the protection effect against friction or flaw from the exterior, and hydroxyethyl cellulose, carboxylmethyl cellulose, polyvinyl alcohol, starch, styrene-myelen and copolymer, single body or copolymer of methacrylic resin such as polymethyl methacrylate or polyethyl methacrylate, resin such as polystyrene, acrylic-styrene copolymer, acrylic resin, polyester resin, chroman resin, ABS resin, or nitrocellulose, resin having flourine-series resin or silicon-series resin mixed therein, or solution obtained by dissolving or dispersing the resin into solvent such as toluene or xylene is formed by use of the coating or printing method such as the spin-coating method, roll-coating method, knife-edge method, offset printing method, gravure printing method, or screen printing method. Further, as the material of the protection layer 30, setting resin such as thermosetting resin, ultraviolet-ray setting resin, electron-beam setting resin can be used, and glass or the like can be used if it has the above property. Further, it is necessary to take the thickness into consideration when the refractive index takes a special value.

Like the above embodiment, it is possible to polar the base member 82 or coat the surface thereof if it does not give a bad influence on the visual determination of the transparent evaporated layer 10.

Unlike the above embodiment, the laminated body of this embodiment is observed from the protection layer 30 side.

A predetermined pattern or the like is printed on the paint layer 28, but it is necessary to permit the transparent evaporated layer 10 to be observed via a portion other than the pattern portion of the print layer 28. The paint layer 28 can be formed by use of the conventionally known printing method or coating method such as gravure printing method. The base member 82 in formed of a material which has the property of absorbing light, and since an optical multi-layer film 10 is formed on the base member 82, a color obtained when observing the thin film along a vertical direction or a color extremely similar to the color is used when the print layer is printed in one color, and at least a color obtained when observing the thin film along a vertical direction or a color extremely similar to the color is used when the print layer in printed in two or more colors.

Figure 16A:
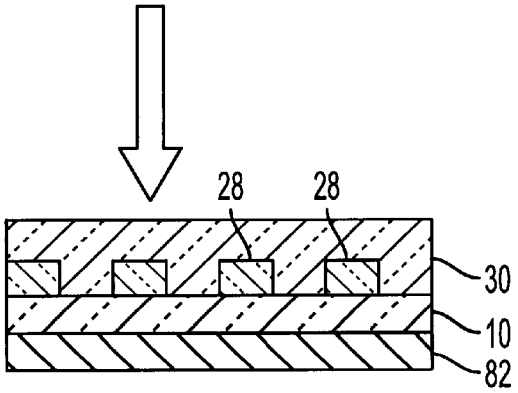
FIGS. 16A and 16B show the operation of the fifth embodiment when it is viewed in the vertical direction.
Figure 16B:
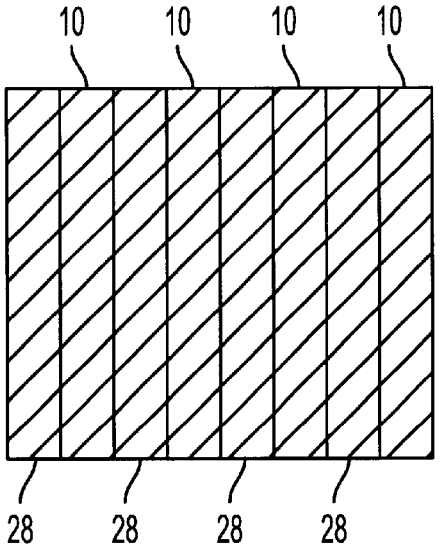

Next, the operation of this embodiment is explained. In this embodiment, a case wherein the paint layer 28 is formed in a stripe pattern is explained. As shown in FIG. 16A, bar-form stripe print layers 28 are arranged at a regular interval and portions of the transparent evaporated layer 10 which lie under the print layers are exposed between the print layers 28. In this case, as described before, since the color, of the print layer 28 is the same as a extremely similar to the color, of the transparent evaporated layer 10 observed when it is viewed in the vertical direction, it is impossible to distinguish the print layer 28 and the transparent evaporated layer 10 from each other as shown in FIG. 16B when they are viewed in tire vertical direction.

Figure 17A:
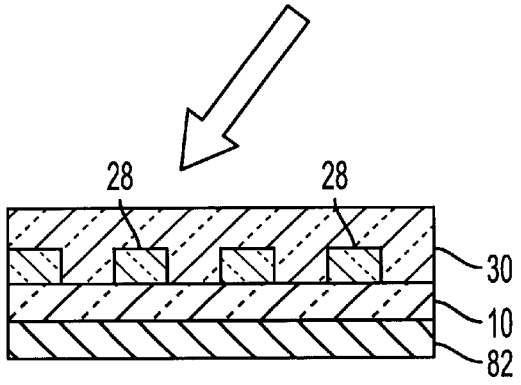
FIGS. 17A and 17B show the operation of the fifth embodiment when it is viewed in an oblique direction.
Figure 17B:
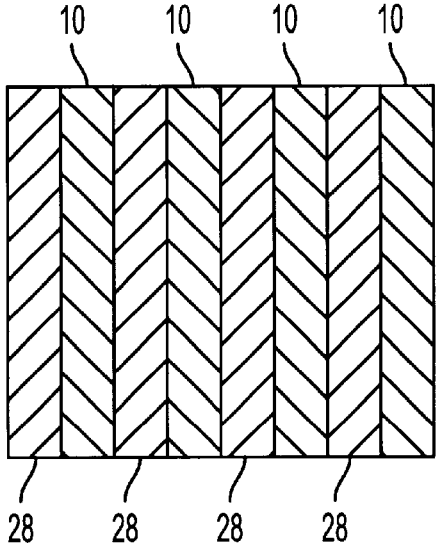

However, as shown is FIG. 17A, since the transparent evaporated layer 10 is constructed by alternately laminating ceramic layers having different refractive indices to a specified thickness the optical path length in the thin film 10 is changed and the color of the transmission light a reflected light is observed as a light of different color when the laminated body is viewed in an oblique direction, and as a result, as shown in FIG. 17B, a color difference a hue difference occurs between the transparent evaporated layer 10 and the print layer 28 whose color is kept unchanged irrespective of the viewing angle and the presence of the transparent evaporated layer 10 can be easily determined Thus, when the laminated body of the present invention is viewed is a certain direction, the print layer and the transparent evaporated layer cannot be distinguished from each other, but when it is viewed in a different direction, the print layer and the transparent evaporated layer come to have different hues, thereby making it possible to easily determine the presence a absence of a specified transparent evaporated layer.

The color of the print layer 28 is not necessarily set similar to the color of the transparent evaporated layer displayed when it is viewed in a vertical direction and it is satisfactory only if the print layer and the transparent evaporated layer can be distinguished from each other when the viewing direction is changed. Further, the print layer 28 can be formed in a desired pattern such as a character, numeral or pattern other than the stripe pattern.

Next, the results of measurements of variations in visible spectra of the laminated bodies wide the above structure measured by use of an invisible/visible spectrophotometer are shows.

(Experiment 55)

The base member 82: a black polyester film with a thickness of 25 $\mu$m;

The low-refractive index layer 8: silicon dioxide;

The high-refractive index layer 6: titanium dioxide;

The number of layers of the layer 10: 5;

The film thickness of the layer 10: 1 $\mu$m;

(Experiment 56)

The base member: a soda glass with a thickness of 1 mm;

The low-refractive index layer 8: silicon dioxide;

The high-refractive index layer 6: titanium dioxide;

The number of layers of the layer 10: 5;

The thickness of the layer 10: 1 $\mu$m.

Figure 18:
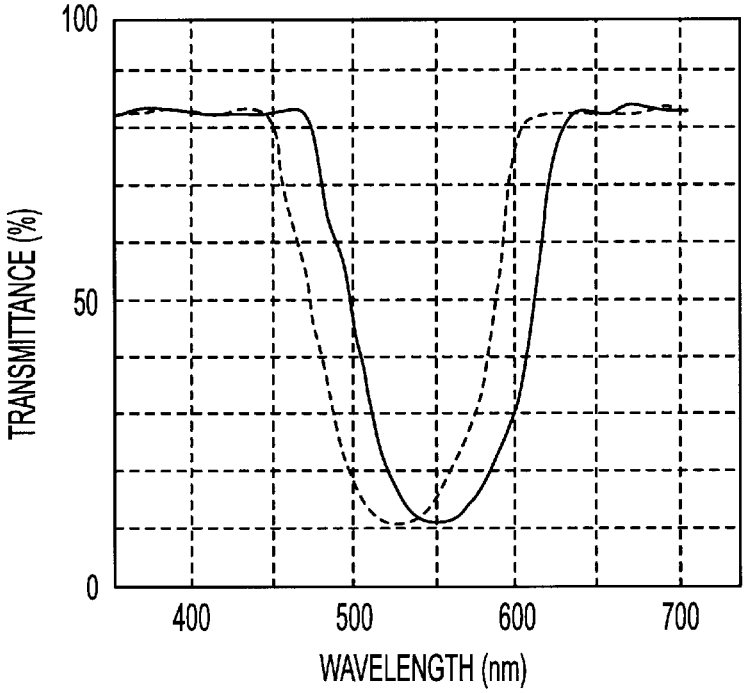
FIG. 18 shows a variation in the visible spectrum of an experiment example of the fifth embodiment.

FIG. 18 shows a variation in the visible spectrum of the experiment SS. The central wavelength of absorption of visible light incident at right angles was 550 nm, and the spectrum obtained when the visible light was made incident in an oblique direction at as angle of 45 degrees was shifted towards the short-wavelength side as indicated by broken lines and a color change occurred. Thus, since the print layer 28 was famed by forming a pattern of printing ink of the same color as that which was observed when the transparent evaporated layer 10 was viewed in the vertical direction, the color of the print layer 28 was not changed but the color of the transparent evaporated layer 10 was changed when the viewing angle was changed, thereby making it possible to clearly determine the pattern of the print layer Also, in the experiment 56, the central wavelength of absorption of visible light incident at right angles was 550 nm, and the spectrum obtained when the visible light was made incident is an oblique direction at an angle of 45 degrees was shifted towards the short-wavelength side and a color change occurred.

As described above, according to this embodiment the print layer is formed in the pattern form on the transparent evaporated layer and the color of the print layer is set similar to the color, of the transparent evaporated layer displayed when it is viewed in a predetermined direction so that the hue difference between the transparent evaporated layer and the print layer will be changed by changing the viewing angle, and therefore, the transparent evaporated layer which could not be distinguished from the print layer comes to be easily observed or the transparent evaporated layer which could be easily observed will come to have the same color as the print layer and cannot be distinguished from the print layer. Thus, it is possible to easily determine the real or imitation of the laminated body.

[Sixth Embodiment]

Figure 19:
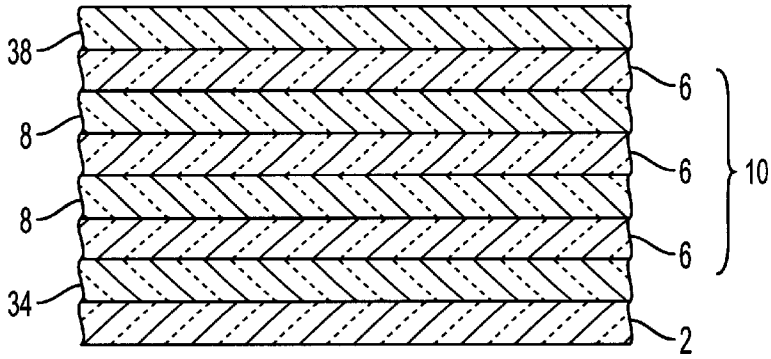
FIG. 19 is a cross sectional view showing one structure of a sixth embodiment of a laminated body according to the present invention.
Figure 20:
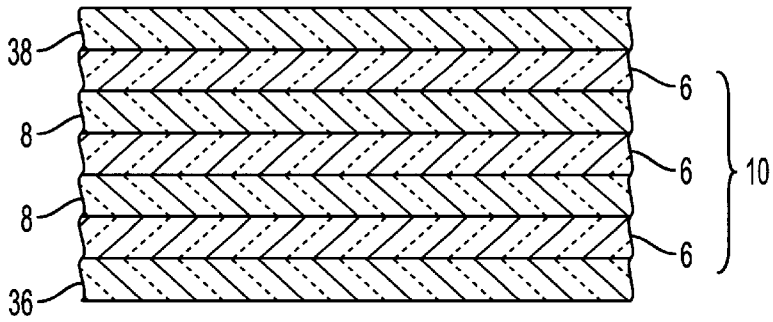
FIG. 20 is a cross sectional view showing anther structure of the sixth embodiment of a laminated body according to the present invention.

FIG. 19 is a cross sectional view showing the structure of the sixth embodiment. A metal deposited layer 34, transparent evaporated layer 10 and transparent protection layer 38 are sequentially laminated on a base member 2. In this embodiment, the laminated body is viewed from above the protection layer 38. As shown in FIG. 20, it possible to form the transparent evaporated layer 10 and transparent protection layer 38 on a metal fed 36 instead of using the base member 2.

The metal deposited layer 34 is preferably formed of a material of high reflection factor and can be formed of gold, aluminum, chrome, nickel or the like. The metal foil 36 is used as a reflection layer and a base member and can be formed of gold, aluminum, chrome, nickel or the like. The protection layer 38 is formed of a high polymer film whose refractive index is lower than that of a high-refractive index ceramic layer 6.

Thus, in this embodiment, since the reflection layer is provided, a shop absorption characteristic can be attained for light rays of specified wavelengths. The half-width value of the absorption band is 20 nm or less and is outside the range of color which can be recognized by human eyes. The peak value of the absorption band obtained when a light ray is made incident on the laminated body at right angles is shifted towards the short-wavelength side and a color variation caused at this time cannot be recognized by the human eyes. The shift amount varies according to the optical thin film, but is approx. several ten nm and can be sufficiently read by use of an optical instrument. That is, in this embodiment, the real or imitation can be determined by detecting the reflected light by use of the optical instrument instead of the human eyes.

Next, the results of measurements of variations in the visible spectra of this embodiment with the above structure measured by use of an invisible/visible spectrophotometer are shown.

(Experiment 61)

Figure 21:
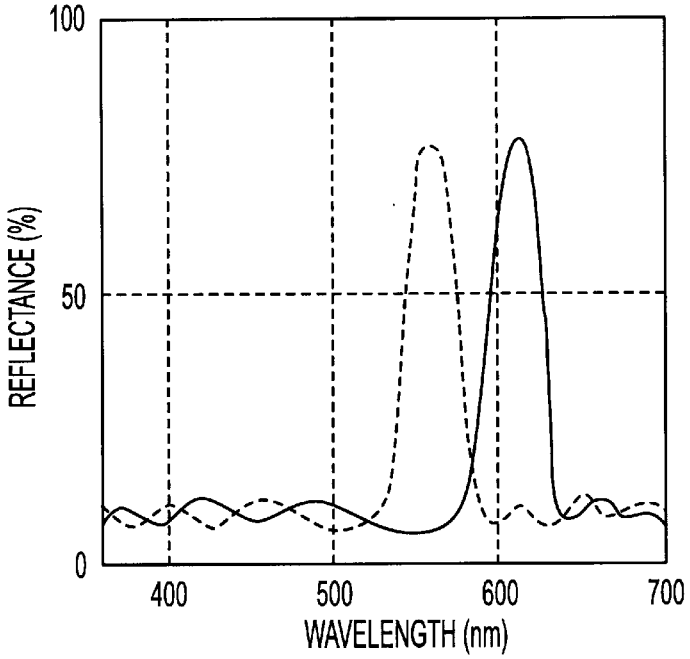
FIG. 21 shows a variation in the visible spectrum of an experiment example of the sixth embodiment.

The base member 2: a transparent polyester film with a thickness of 12 $\mu$m;

The metal deposited layer 34: a layer obtained by vapor-depositing aluminum to a thickness of 1000 Åby the vacuum deposition method;

The low-refractive index layer 8: silicon dioxide;

The high-refractive index layer 6: titanium dioxide;

The number of layers of the layer 10: 5;

The thickness of the layer 10: 1 $\mu$m;

The central wavelength of maximum absorption of the visible light perpendicular to the film in the visible range in this experiment was 620 nm as shown in FIG. 21. When the light is made incident in a direction at an angle of 45 degrees, the central wavelength is shifted towards the short-wavelength side as indicated by broken lines is the drawing.

(Experiment 62)

The base member: an aluminum foil 36 with a thickness m 12 $\mu$m;

The low-refractive index layer 8: silicon dioxide;

The high-refractive index layer 6: titanium dioxide;

The number of layers layer 10: 5;

The thickness of the layer 10: 1 $\mu$m.

Like the characteristic shown in FIG. 21, in the optical characteristic of this experiment, the central wavelength is shifted towards the short-wavelength side when the light is made incident in a direction at an angle of 45 degrees.

As described above, according to this embodiment, since two types of ceramic layers having different refractive indices are laminated on the metal deposited layer or metal foil, the spectrum of the reflected light is slightly changed according to the angle. By detecting the change by use of a detector, the real or imitation m the laminated body can be determined.

[Seventh Embodiment]

Figure 22:
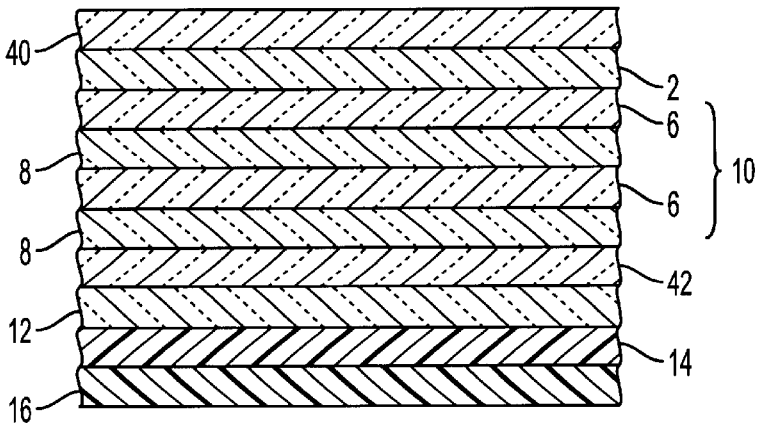
FIG. 22 is a cross sectional view showing one structure of a seventh embodiment of a laminated body according to the present invention.

FIG. 22 is a cross sectional view showing the structure of the seventh embodiment. A hard protection layer 40 is formed on the top surface of a base member 2, and a transparent evaporated layer 10, a thin film layer 42 formed of an element of III to VI group, the oxide, carbide, nitride, or boride thereof, a colored layer 12, an adhesion anchor layer 14, and an adhesive layer 16 are sequentially laminated on the under surface of the base member 2. The colored layer 12, and adhesion anchor layer 14 can be omitted.

As the hard protection layer 40, a hard transparent thin film formed of a chemically stable material such as diamond, diamond-like carbon, silicon carbide, aluminum oxide, silicon oxide, or boron nitride is used, for example. This can enhance the resistance to abrasion and the resistance to chemical attack and can enhance the durability under the severe service condition. Thus, the forgery preventing ability of the seal and the decorative effect can be maintained for a long period of time.

Generally, if the adhesive layer 16 is formed to add the function of a seal after ceramics layers 6 and 8 with different refractive indices are sequentially laminated, the refractive index of the transparent evaporated layer 10 which is set in contact with the adhesive layer 16 is changed to deteriorate the optical characteristic of the transparent evaporated layer 10. Further, if the adhesion strength between the base member 2 and the transparent evaporated layer 10 is insufficient, cracks may occur in the transparent evaporated layer 10 because of the volume contraction caused by curing of the adhesive agent. Far this reason, the simplicity of determination between the real or imitation of the article which is the requirement characteristic of the forgery preventing seal is lowered and the decorative effect and the color thereof obtained when it is visually observed are deteriorated. An object to which the seal is affixed is mainly a card, video cassette case or the like which is required to be prevented from being forged. Since these articles are daily used by various people, it is particularly required to have the excellent durability in the severe service condition. However, since a high polymer film such as polyester or polyolefine is generally used as the base member film 2 used as the top surface layer of the seal, it cannot be said that a sufficiently high performance in the severe service condition, for example, the excellent durability can be attained. By forming the protection layer 40, the above problem can be solved.

The thin film layer 42 is formed of diamond-like carbon, silicon carbide or boron carbide, for example. The thin film 42 is preferably formed of a material of high refractive index. In order to form the thin film layer 42 as a transparent layer, diamond (n=2.2 to 2.4), diamond-like carbon (n=2.1 to 2.3), silicon carbide (n=2.4 to 2.6), or boron nitride (n=2.0 to 2.2) may be used as the material thereof, and in order to form the thin film layer 42 as an opaque layer, diamond-like carbon a=2.1 to 2.3), silicon carbide (n=2.4 to 2.6), a boron nitride (n=2.0 to 2.2) may be used or the material thereof.

Since the base member 2 is a high polymer film formed of organic polymer, the refractive index thereof is low and it is necessary to form a layer arranged is contact with the base member 2 by use of a material of high refractive index. A transparent evaporated layer (multi-layer interference film) 10 is formed by alternately laminating high-refractive index layers 6 and low-refractive index layers 8 based on the optical interference theory and the spectral characteristic varies according to the number of layers. The number of layers including the base member 2 is even but the number of the multi-layer interference film 10 is this embodiment.

The thin film layer 42 is formed of an element of III to VI group, the oxide, carbide, aitride, or boride thereof. By thus forming the thin film 42 which is hard or rigid and chemically stable and has a high-refractive index, the adhesive layer 16 can be formed without deteriorating the spectral characteristic of the multi-layer interference layers while occurrence of a variation in the refractive index of the transparent evaporated layer set in contact with the adhesive layer 16 caused when the adhesive layer is formed can be prevented and occurrence of cracks in the transparent evaporated layer 10 due to the volume contraction caused by curing of the adhesive agent and the insufficient adhesion strength between the base member 2 and the transparent evaporated layer 10.

By making the thin film layer 42 transparent or opaque, the spectral characteristic of the transmission light or reflected light can be freely set according to the color of the thin film layer in addition to the number of layers and the film thickness, the decorative effect and forgery preventing effect can be enhanced and the added value can be made high.

Next, the results of measurements of variations in visible spectra of the laminated bodies of this embodiment with the above structure measured by use of a n invisible/visible spectrophotometer are shown.

(Experiment 71)

The base member 2: a polyester film with a thickness of 25 μm;

The low-refractive index layer 8: silicon dioxide;

The high-refractive index layer 6: zirconium oxide;

The number of layers of the layer 10: 5;

The thickness of the layer 10: 1 μm;

The hard protection film: transparent boron nitride.

The central wavelength of maximum absorption of the visible light perpendicular to the film in the visible range in the transparent evaporated layer was 550 nm. When the light is made incident in a direction at an angle of 45 degrees, the central wavelength is shifted towards the short-wavelength side. When visually observing the film, a transmission light of bluish purple color could be observed when viewing the film in an oblique direction at an angle of 45 degrees, and thus it was excellent in the simplicity of determination and the decorative effect. The adhesion strength of the transparent evaporated layer to the base member was sufficient. It is preferable to set the total film thickness of the transparent evaporated layer 10 to 1 μm or less. If it is set to be larger than 1 μm, the flexibility thereof becomes insufficient, thereby causing cracks in the transparent evaporated layer and degrading the optical characteristic thereof.

(Experiment 72)

The base member: a polyester film with a thickness of 25 μm;

The low-refractive index layer 8: magnesium fluoride;

The high-refractive index layer 6: zinc sulfide;

The number of layers of the layer 10: 5;

The thickness of the layer 10: 1.5 μm;

The hard protection film: black and opaque diamond-like carbon.

The visible light in the vertical direction cannot pass because of the presence of the black and opaque diamond-like carbon. When visually observing the film, a reflected light of golden color could be observed when viewing the film in the vertical direction and a transmission light of bluish green color could be observed when viewing the film in an oblique direction at an angle of 45 degrees, and thus it was excellent in the simplicity of determination and the decorative effect. The adhesion strength of the transparent evaporated layer to the base member was sufficient.

(Experiment 73)

The base member: a polyester film with a thickness of 25 μm;

The low-refractive index layer 8: silicon divide;

The high-refractive index layer 6: zirconium oxide;

The number of layer of the layer 10: 5;

The thickness of the layer 10: 1 μm;

The hard protection film: transparent diamond-like carbon thinner than that of the experiment 72.

The central wavelength of maximum absorption of the visible light perpendicular to the film in the visible range of the transparent evaporated layer was 550 nm. When the light is made incident in a direction at an angle of 45 degrees, the central wavelength is shifted towards the short-wavelength aide. When visually observing the film, a transmission light of bluish purple color (which is a complementary color of golden color in the experiment 72) could be observed when viewing the film is the vertical direction and a transmission light of reddish purple color could be observed when viewing the film in an oblique direction at an angle of 45 degrees, and thus it was excellent in the simplicity of determination and the decorative effect. The adhesion strength of the transparent evaporated layer to the base member was sufficient.

(Experiment 74)

The base member: a polyester film with a thickness of 25 μm;

The low-refractive index layer 8: silicon dioxide;

The high-refractive index layer 6: titanium dioxide;

The number of layer of the layer 10: 5;

The thickness of the layer 10: 1 μm;

The hard protection film: transparent diamond-like carbon.

The central wavelength of maximum absorption of the visible light perpendicular to the film in the visible range of the transparent evaporated layer was 550 nm. When the light is made incident in a direction at an angle of 45 degrees, the central wavelength is shifted towards the short-wavelength side. When visually observing the film, a transmission light of bluish purple color could be observed when viewing the film in the vertical direction and a transmission light of reddish purple color could be observed when viewing the film in an oblique direction at an angle of 45 degrees, and thus it was excellent in the simplicity of determination and the decorative effect. The adhesion strength of the transparent evaporated layer to the base member was sufficient.

(Experiment 75)

The base member: a polyester film with a thickness of 25 μm;

The low-refractive index layer 8: cerium fluoride;

The high-refractive index layer 6: cerium dioxide;

The number of layer of the layer 10: 5;

The thickness of the layer 10: 1 μm;

The hard protection film: transparent silicon carbide.

The central wavelength of maximum absorption of the visible light perpendicular to the film is the visible range of the transparent evaporated layer was 550 nm. When the light is made incident in a direction at an angle of 45 degrees, the central wavelength is shifted towards the short-wavelength side. When visually observing the film, a transmission light of bluish purple polar could be observed when viewing the film in the vertical direction and a transmission light of reddish purple color could be observed when viewing the film in an oblique direction at an angle of 45 degrees, and thus it was excellent in the simplicity of determination and the decorative effect. The adhesion strength of the transparent evaporated layer to the base member was sufficient.

(Experiment 76)

The base member: a polyester film with a thickness of 25 μm;

The low-refractive index layer 8: silicon dioxide;

The high-refractive index layer 6: zirconium oxide;

The number of layer of the layer 10: 5;

The thickness of the layer 10: 1 μm;

The thin film layer transparent boron nitride;

The hard protective film: transparent boron nitride.

The central wavelength of maximum absorption of the visible light perpendicular to the film is the visible range of the transparent evaporated layer was b 550nm. When the light is made incident in a direction at an angle of 45 degrees, the central wavelength is shifted towards the short-wavelength side. When visually observing the film, a transmission light of bluish purple color could be observed when viewing the film in the vertical direction and a transmission light of reddish purple color could be observed when viewing the film in an oblique direction at an angle of 45 degrees, and thus it was excellent in the simplicity μm; determination and the decorative effect. The adhesion strength of the transparent evaporated layer to the base member was sufficient. The seal of this embodiment was affixed to a polyvinyl chloride plate and rubbed with steel wool (Bon-star (trade mark) No. 00) made by NIPPON STEEL WOOL Co., but no scar was made because of the presence of the hard protection layer and it was excellent in the resistance to abrasion.

(Experiment 77)

The base member: a polyester film with a thickness of 25 μm;

The low-refractive index layer 8: silicon dioxide;

The high-refractive index layer 6: titanium dioxide;

The number of layer of the layer 10: 5;

The thickness of the layer 10: 1 μm;

The hard protection film: transparent diamond-like carbon.

The central wavelength of maximum absorption of the visible light perpendicular to the film in the visible range of the transparent evaporated layer was b 550nm. When the light is made incident in a direction at as angle of 45 degrees, the central wavelength is shifted towards the short-wavelength side. When visually observing the film, a transmission light of bluish purple color could be observed when viewing the film in the vertical direction and a transmission light of reddish purple color could be observed when viewing the **film is an oblique direction at an angle of 45 degrees, and thus it was excellent in the simplicity of determination and the decorative effect. The adhesion strength of the transparent evaporated layer to the base member was sufficient. The seal of this embodiment was affixed to a polyvinyl chloride plate and rubbed with steel wool (Bon-star No. 00) made by NIPPON STEEL WOOL Co., but no scar was made because of the presence of the hard protection layer and it was excellent in the resistance to abrasion.

(Comparison Example 71)

The base member: a polyester film with a thickness of 25 μm;

The low-refractive index layer 8: silicon dioxide;

The high-refractive index layer 6: titanium dioxide;

The number of layer of the layer 10: 5;

The thickness of the layer 10: 1 μm.

The central wavelength of maximum absorption of the visible light perpendicular to the film in the visible range of the transparent evaporated layer was 550 nm. When the light is made incident in a direction at an angle of 45 degrees, the central wavelength is shifted towards the short-wavelength side. When visually observing the film, a transmission light of light bluish purple color could be observed when viewing the film in the vertical direction and a transmission light of light reddish purple color could be observed when viewing the film in an oblique direction at an angle of 45 degrees, but the color was light and a variation in the color was not clear, and it was inferior in the simplicity of determination and the decorative effect. The adhesion strength of the transparent evaporated layer to the base member was sufficient.

(Comparison Example 72)

The base member: a polyester film with a thickness of 25 μm;

The low-refractive index layer 8: magnesium fluoride;

The high-refractive index layer 6: zinc sulfide;

The number of layer of the layer 10: 5;

The thickness of the layer 10: 1 μm.

The central wavelength of maximum absorption of the visible light perpendicular to the film in the visible range of the transparent evaporated layer was 550 nm. When the light is made incident in a direction at an angle of 45 degrees, the central wavelength is shifted towards the short-wavelength side. When visually observing the film, a transmission light of light bluish purple color could be observed when viewing the film in the vertical direction and a transmission light of light reddish purple color could be observed when viewing the film in an oblique direction at an angle of 45 degrees, and a variation in the color was clear, but cracks occurred in the transparent evaporated layer and it was extremely low in the decorative effect and the quality of the seal. The adhesion strength of the transparent evaporated layer to the base member was insufficient (Comparison Example 73)

The base member: a polyester film with a thickness of 25 μm;

The low-refractive index layer 8: silicon dioxide;

The high-refractive index layer 6: titanium dioxide;

The number of layer of the layer 10: 5;

The thickness of the layer 10: 1 μm.

The central wavelength of maximum absorption of the visible light perpendicular to the film in the visible range of the transparent evaporated layer was 550 nm. When the light is made incident in a direction at an angle of 45 degrees, the central wavelength is shifted towards the short-wavelength side. When visually observing the film, a transmission light of light bluish purple color could be observed when viewing the film in the vertical direction and a transmission light of light reddish purple color could be observed when viewing the film in an oblique direction at an angle of 45 degrees, but it was light in color and a variation in the color was not clear, and it was inferior in the simplicity of determination and the decorative effect. The adhesion strength of the transparent evaporated layer to the base member was sufficient. When it was rubbed, many scars was made on the entire surface and it was low in the resistance to abrasion.

Color changes of the reflected light caused when a visible light say is made incident on the films of the above experiments and comparison examples and the incident direction is changed from the right angles to 41 degrees are shown in the following tables 7 and 8.

TABLE 7

| Ex. | First Layer | Second Layer | Third Layer | Fourth Layer | Fifth Layer | Prot. Layer | Color Change | Decorative Effect | Adhesion Strength |
|---|---|---|---|---|---|---|---|---|---|
| 71 | $ZrO_2$ | $SiO_2$ | $ZrO_2$ | $SiO_2$ | BN | | GOOD | GOOD | GOOD |
| 72 | ZnS | $MgF_2$ | ZnS | $MgF_2$ | DLC | | GOOD | GOOD | GOOD |
| 73 | $ZrO_2$ | $SiO_2$ | $ZrO_2$ | $SiO_2$ | DLC | | GOOD | GOOD | GOOD |
| 74 | $TiO_2$ | $SiO_2$ | $TiO_2$ | $SiO_2$ | DLC | | GOOD | GOOD | GOOD |
| 75 | $CaO_2$ | $CeF_3$ | $CeO_2$ | $CeF_3$ | SiC | | GOOD | GOOD | GOOD |
| 76 | $ZrO_2$ | $SiO_2$ | $ZrO_2$ | $SiO_2$ | BN | BN | GOOD | GOOD | GOOD |
| 77 | $TiO_2$ | $SiO_2$ | $TiO_2$ | $SiO_2$ | DLC | DLC | GOOD | GOOD | GOOD |

TABLE 8

| Comp. Ex. | First Layer | Second Layer | Third Layer | Fourth Layer | Fifth Layer | Prot. Layer | Color Change | Decorative Effect | Adhesion Strength |
|---|---|---|---|---|---|---|---|---|---|
| 71 | $TiO_2$ | $SiO_2$ | $TiO_2$ | $SiO_2$ | DLC | | POOR | POOR | GOOD |
| 72 | ZnS | $MgF_2$ | ZnS | $MgF_2$ | ZnS | | GOOD | POOR | POOR |
| 73 | $TrO_2$ | $SiO_2$ | $TiO_2$ | $SiO_2$ | $TiO_2$ | | POOR | POOR | GOOD |

In the above tables, DLC indicates diamond like carbon.

As described above, according to this embodiment, by forming the thin film layer which is hard or rigid and chemically stable and leas a high-refractive index by use of as element of III to VI group, the oxide, carbide, nitride, or boride thereof, the adhesive layer can be formed without deteriorating the optical characteristic of the transparent evaporated layer.

[Eighth Embodiment]

Figure 23:
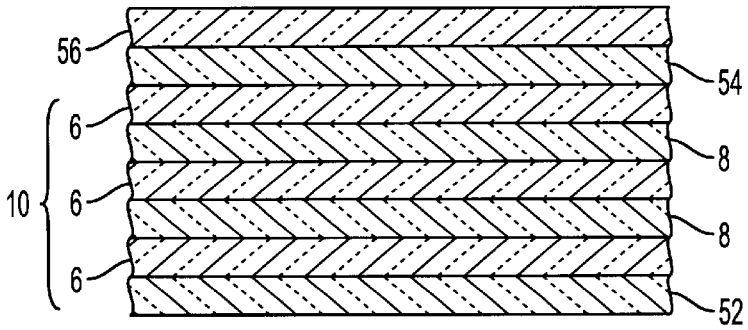
FIG. 23 is a cross sectional view showing one structure of an eighth embodiment of a laminated body according to the present invention.

FIG. 23 is a cross sectional vies showing the structure of the eighth embodiment relating to a copying-inhibited printed matter which can be prevented from being dishonestly copied. A transparent evaporated layer 10, print layer 54 and protection layer 56 are sequentially laminated on the upper surface of a base member 52.

The base member 52 can be may type of material such as a sheet of paper, high polymer film a metal foil if it is used as a printed matter, but the surface thereof is preferably made smooth. Preferably, if a sheet of paper is used as the printed matter, it is desired to use the paper whose surface is subjected to the surface-filling process. More preferably, it is desired to cast a colored base member as the base member 52 in order to fully achieve the copying-inhibiting function according to the present invention. In the case of a metal foil any metal among aluminum, chrome, nickel, copper and gold can be used. The thickness of the base member 52 is set to such a thickness as to maintain the flexibility thereof.

A method for forming the print layer 54 is not limitative, but if the print layer 54 is longed on the entire surface of the base member 52, the function of the present invention cannot be attained. Therefore, preferably, it is desired to print characters or a simple pattern on the base member 52 in the present invention.

The protection layer 56 is required to have a refractive index different from that of a layer (in this case, the high-refractive index layer 6) of the transparent evaporated layer 10 which lies on the protection layer side. Since the refractive index of 1.5 to 1 can be attained and is different from that of the high-refractive index layer 6 if high polymer is used, the above condition can be satisfied. Further, the protection layer 54 may be formed of ceramics such as silicon dioxide or titanium dioxide, or organic hard protection film of diamond-like carbon (DLC) or the like.

Since the color tone of the transparent evaporated layer 10 is dependent on the viewing angle, it can be copied only in one color when it is copied by use of a coping machine, and thus it can be used as a printed matter effective for forgery prevention.

Figure 24:
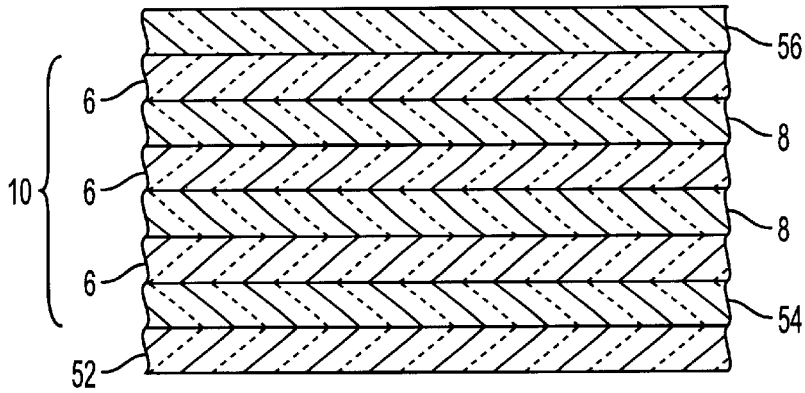
FIG. 24 is a cross sectional view showing another structure of the eighth embodiment of a laminated body according to the present invention.

The position of the print layer 54 is not limited to a position between the transparent evaporated layer 10 and the protection layer 56, but may be set between the base member 52 and the transparent vapor-deposition layer 10 as shown in FIG. 24.

Next, the results of measurements of variations in visible spectra of this embodiment with the above structure measured by use of an invisible/visible spectrophotometer are shown.

(Experiment 81)

The base member 52: a black polyester film with a thickness of 50 $\mu$m;

The low-refractive index layer 8: silicon dioxide;

The high-refractive index layer 6: titanium dioxide;

The number of layer of the layer 10: 5;

The thickness of the layer 10: 1 $\mu$m.

The central wavelength of maximum absorption of the visible light perpendicular to the film in the visible range of the transparent evaporated layer was 580 nm. When the light is made incident in a direction at an angle of 45 degrees, the central wavelength is shifted towards the short-wavelength side. The color of the printed mattes copied in color was golden, but the color was not changed when the viewing angle was changed, and thus the real or imitation thereof could be easily determined.

(Experiment 82)

The base member 52: paper whose surface is subjected to the filling process and which has a thickness of 100 μm;

The low-refractive index layer 8: silicon dioxide;

The high-refractive index layer 6: titanium dioxide;

The number of layer of the layer 10: 5;

The thickness of the layer 10: 1 μm.

The central wavelength of maximum absorption of the visible light perpendicular to the film in the visibly range of the transparent evaporated layer was 580 nm. When the light is made incident in a direction at an angle of 45 degrees, the central wavelength is shifted towards the short-wavelength side. The color of the printed matter copied in color was yellow, but the color was not changed when the viewing angle was changed, and thus the real a imitation thereof could be easily determined.

(Experiment 83)

The base member 52: an aluminum foil with a thickness of 20 μm;

The low-refractive index layer 8: silicon dioxide;

The high-refractive index layer 6: titanium dioxide;

The numbs of layer of the layer 10: 5;

The thickness of the layer 10: 1 μm.

The central wavelength of maximum absorption of the visible light perpendicular to the film in the visible range of the transparent evaporated layer was 580 nm. When the light is made incident in a direction at an angle of 45 degrees, the central wavelength is shifted towards the short-wavelength side. The color of the printed matter copied in color was yellow, but the color was not changed when the viewing angle was changed, and thus the real a imitation thereof could be easily determined.

(Experiment 84)

The base member 52: paper whose surface is subjected to the filling process and which has a thickness of 100 μm;

The low-refractive index layer 8: silicon dioxide;

The high-refractive index layer 6: titanium dioxide;

The number of layer of the layer 10: 5;

The thickness of the layer 10: 1 μm.

The central wavelength of maximum absorption of the visible light perpendicular to the film in the visible range of the transparent evaporated layer was 580 nm. When the light is made incident in a direction at an angle of 45 degrees, the central wavelength is shifted towards the short-wavelength side. The color of the printed matter copied in color was yellow, but the color was not changed when the viewing angle was changed, and thus the real a imitation there could be easily determined.

(Experiment 85)

The base member 52: paper whose surface is subjected to the filling process and which has a thickness of 100 μm;

The low-refractive index layer 8: silicon dioxide;

The high-refractive index layer 6: titanium dioxide;

The number of layer of the layer 10: 5;

The thickness of the layer 10: 1 μm.

The central wavelength of maximum absorption of the visible light perpendicular to the film in the visible range of the transparent evaporated layer was 580 nm. When the light is made incident in a direction at an angle of 45 degrees, the central wavelength is shifted towards the short-wavelength side. The color of the printed matter copied in color was yellow, but the color was not changed when the viewing angle was changed, and thus the real a imitation there could be easily determined.

(Experiment 86)

The base member: paper whose surface is subjected to the filling process and which has a thickness of 100 μm;

The low-refractive index layer 8: silicon dioxide;

The high-refractive index layer of the transparent evaporated layer titanium dioxide;

The number of layer of the layer 10: 5;

The thickness of the layer 10: 1 μm.

The central wavelength of maximum absorption of the visible light perpendicular to the film in the visible range of the transparent evaporated layer was 580 nm. When the light is made incident in a direction at an angle of 45 degrees, the central wavelength is shifted towards the short-wavelength side. The color of the printed matter copied in color was yellow, but the color was not changed when the viewing angle was changed, and thus the real a imitation thereof could be easily determined.

The results of evaluation of the above experiments 81 to 86 are shown in the following table 9.

TABLE 9

| Ex. | Base Member | Maximum Absorption Wavelength (nm) | Tbne Variation | Possibility of Copying |
|---|---|---|---|---|
| 81 | Polyester Film | 580 | ◎ | x |
| 82 | Surface-Filled Paper | 580 | ○ | x |
| 83 | Aluminum Foil | 580 | Δ | x |
| 84 | Surface-Filled Paper | 580 | ○ | x |
| 85 | Surface-Filled Paper | 580 | ○ | x |
| 86 | Surface-Filled Paper | 580 | ○ | x |

In the above table, ◎ indicates a significant variation, ○ indicates a recognizable variation, Δ indicates a slightly recognizable variation, and X indicates that no color tone variation occurs in the copy.

If the laminated body of the above embodiment is affixed to a document which is required to be prevented from being copied and when the document is copied, the real a imitation of the document can be easily determined by checking the color of the laminated body while changing the viewing direction.

[Ninth Embodiment]

Figure 25:
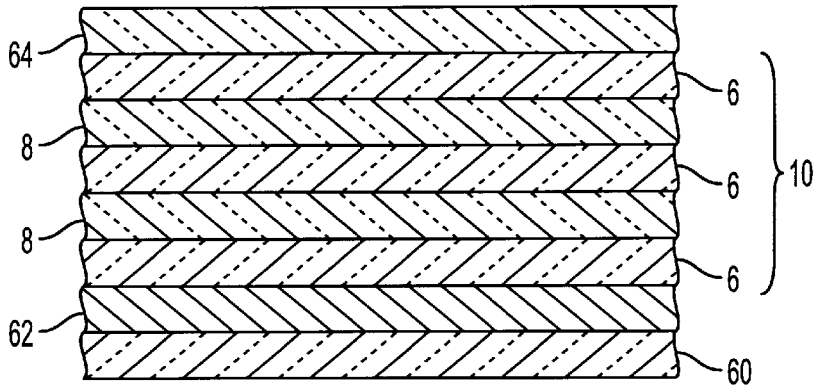
FIG. 25 is a cross sectional view showing one structure of an ninth embodiment of a laminated body according to the present invention.

FIG. 25 is a cross sectional view showing the structure of the ninth embodiment. A reflection layer 62, transparent evaporated layer 10 and protection layer 64 are sequentially laminated on a base member 60. The transparent evaporated layer 10 is partially formed. For example, the transparent evaporated layer 10 is famed in pattern form on the base member 60 so that the transparent evaporated layer may be formed on part of the base member and will not be formed in the remaining portion of the base member. Alternatively, the transparent evaporated layer 10 is formed of a plurality of ceramic layers having different refractive indices as described before, and part of the transparent evaporated layer 10 may be formed to have a different number of ceramic layers from that of the remaining portion or the total film thickness thereof may be made different from that of the remaining portion. Such a structure can be obtained by destroying the entire portion a part of the transparent evaporated layer by sputtering, etching a the like or forming the layer with a larger a smaller film thickness at the time of film formation. With the above structure, the intensity a position of the spectra of the absorption band and reflection band is changed in part of the transparent evaporated layer.

The base member 60 can be formed of any material if it can support the transparent evaporated layer 10, and may be a plastic card such as a cash card a credit card, prepaid card used for transportation means or telephones, or a sheet of paper such as an admission ticket for the site for amusements a exhibition. Further, the type thereof can be a seal or transfer foil. As the material of the base member 60, polyvinyl chloride or the like can be used. The reflection layer 62 is provided to reflect the incident light from the light source of the detection device as will be described later and can be formed of gold, nickel, chrome or the like.

Like the above embodiment, the film thickness of the evaporated layer 10 is controlled so that it can have an absorption band in a specified wavelength range.

Figure 26:
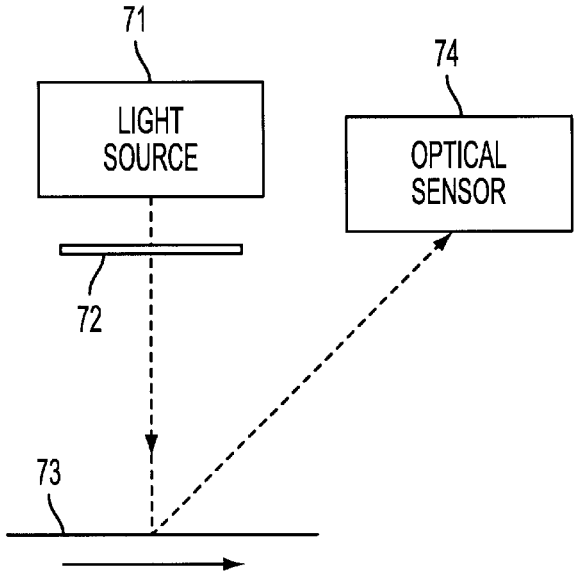
FIG. 26 shows the schematic structure of a detection device for the laminated body of the ninth embodiment.

The protection layer 64 is used to protect the transparent evaporated layer 10 when the layer 10 is formed of soft ceramic such as zinc sulfide. The laminated body of this embodiment is observed from the protection layer 64 sides FIG. 26 is a view showing the schematic structure of the detection device for the laminated body. A slit 72 is disposed on the front side of a light source 71 to form a slit light source. The light source 71 projects a light to the laminated body 73 in the vertical direction A reflected light traveling in an oblique direction at an angle of 45 degrees is detected by an optical sensor 74. The light source 71 and optical sensor 74 are fixed and the laminated body 73 moves with respect to the light source 71 and optical sensor 74. The light source 71 can preferably emit a stable light in the absorption wavelength range. Further, it is preferable that the emission light is not a homogeneous light but a light in a wide wavelength range. In this example, as the emission light, a visible light whose wavelength is in the range of 400 nm to 700 nm or 800 nm is used.

The optical sensor 74 is formed of diffraction grating or photodiode array. In order to enhance the sensitivity of the optical sensor in the absorption wavelength range and in order to permit the precision thereof to be freely set, it is preferable to use the photodiode array. In this example, a plurality of photodiodes each of which can detect a light with a wavelength width of 0.5 to 2 nm are arranged to form a photodiode array. With the photodiode array, a light subjected to the spectral diffraction can be instantaneously detected. Further, it becomes possible to easily limit the wavelength by use of several prisms. In order to detect the light, it is possible to detect the light by converting the light passing the prism into an electrical signal by a photomultiplier, but in this case:, it is not preferable because a time variation is large and a relatively long time is necessary for one reading.

The selective transmission for light in a specified wavy length range in the visible light is determined by the transparent evaporated layer 10. Since the reflection layer 62 is provided, sharp absorption is observed for light rays of specified wavelengths and the half-width value of the absorption band is 20 nm or loss and is outside the range of polar variation which can be recognized by human eyes. The peak value of the absorption band obtained when a light ray is made incident on the laminated body in an oblique direction is shifted towards the short-wavelength side in comparison with a case wherein a light ray is made incident on the laminated body at right angles and a color variation caused at this time cannot be recognized by the human eyes, but in this embodiment, the color variation is detected by use of a device. The shift amount and half-width value can be adjusted according to the thickness of the evaporated layer 10 and can be changed according to the application and purpose thereof.

Next, the results of measurements of variations in visible spectra of the embodiment with the above structure measured by use of an invisible/visible spectrophotometer are shown (Experiment 91)

Figure 27A:
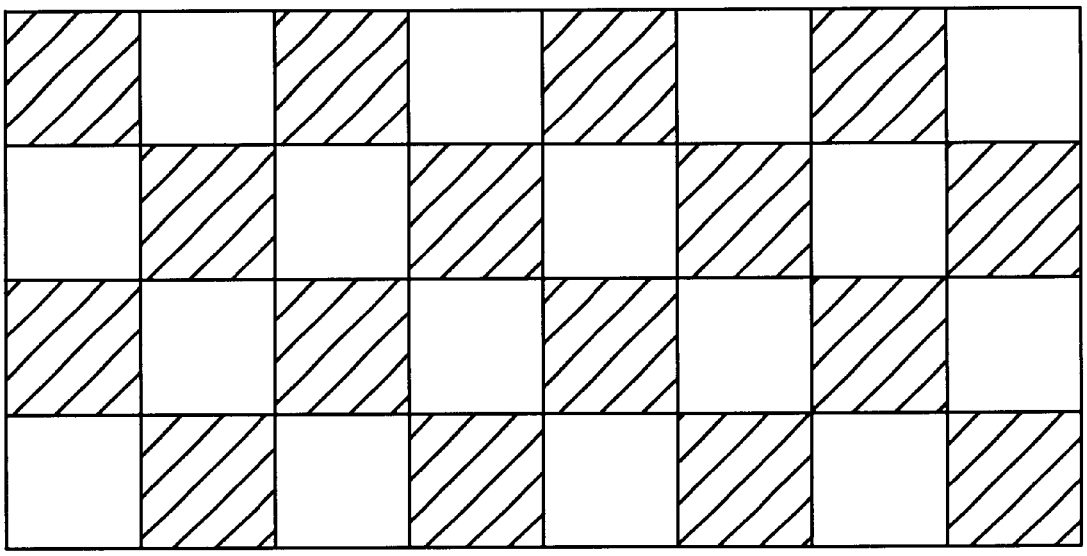
FIGS. 27A and 27B show a detection pattern of one example of the ninth embodiment.

The base member 60: vinyl chloride;

The reflection layer 62: aluminum;

The pattern of the layer 10: mosaic form shown in FIG. 27A;

The low-refractive index layer 8: silicon dioxide;

The high-refractive index layer 6: titanium dioxide;

The number of layers of the layer 10: 5.

Figure 27B:
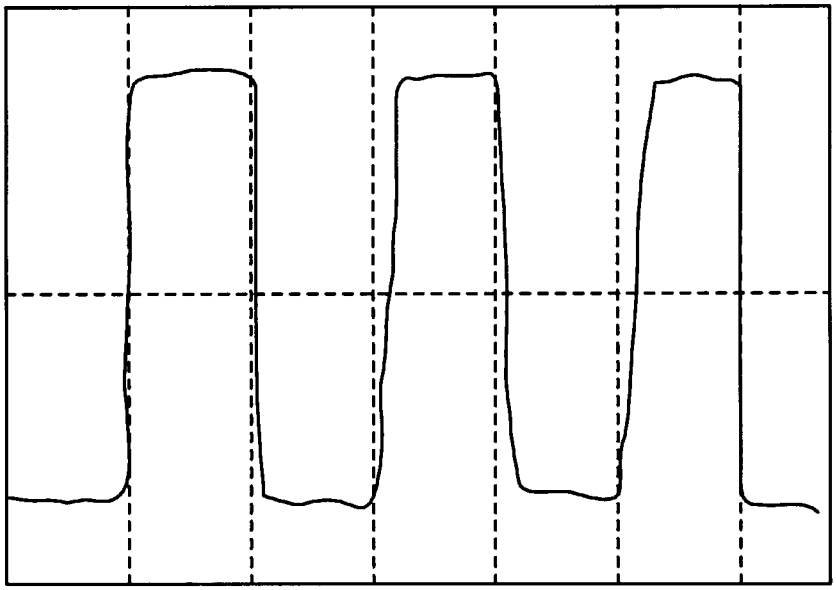

When the reflected light was detected by the optical sensor 74 in an oblique direction at 45 degrees with respect to the vertical incident light, a response signal as shown in FIG. 27B was obtained.

(Experiment 92)

Figure 28A:
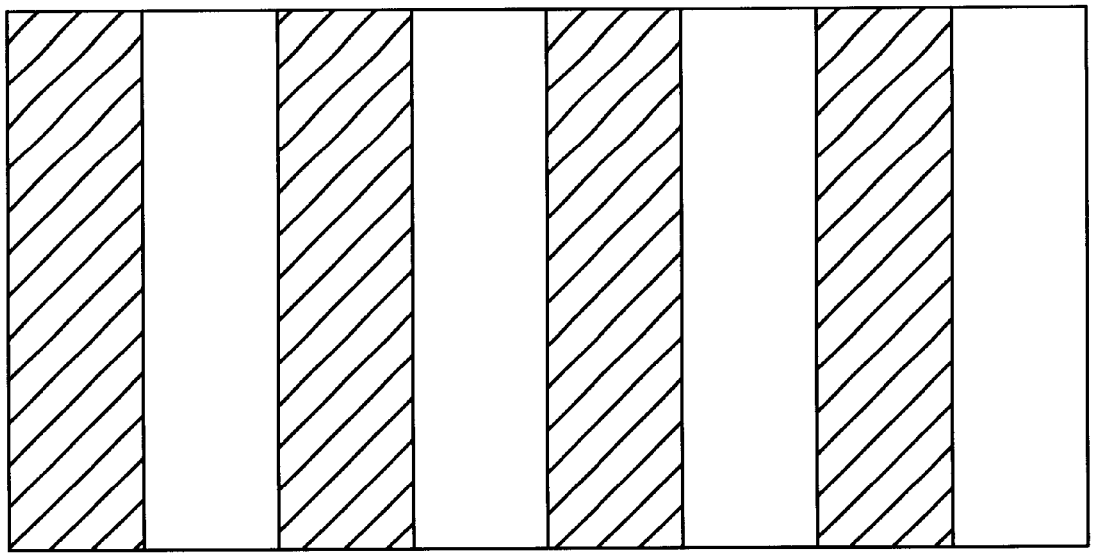
FIGS. 28A and 28B show a detection pattern of another example of the ninth embodiment.

This is similar to the experiment 91 except that the pattern of the evaporated layer 10 is a stripe form as shown in FIG. 28A.

Figure 28B:
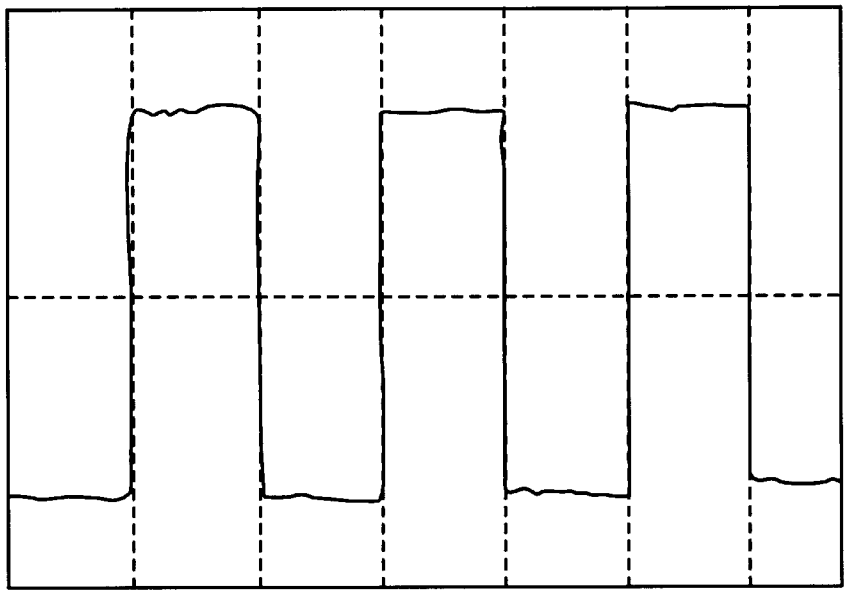

When the reflected light was detected by the optical sensor 74 in an oblique direction at 45 degrees with respect to the vertical incident light, a response signal as shown in FIG. 28B was obtained.

(Experiment 93)

Figure 29A:
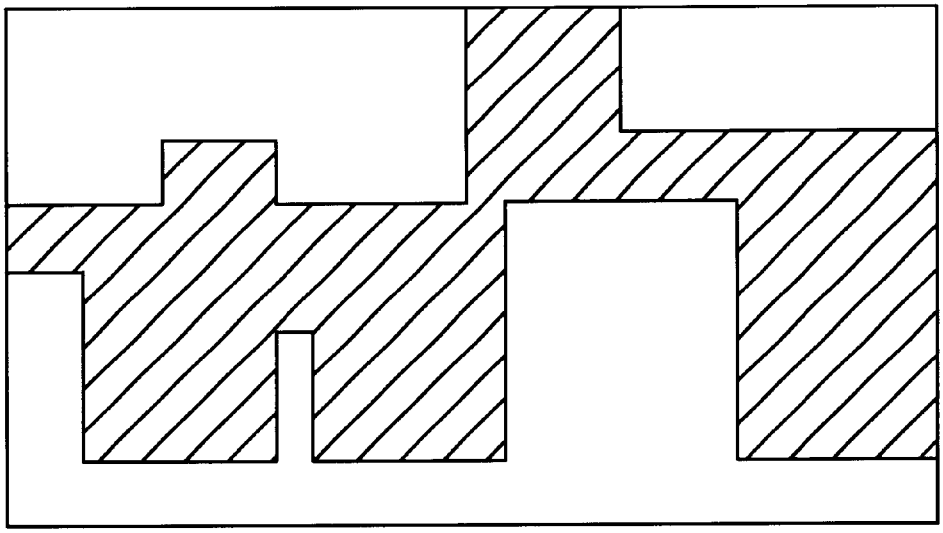
FIGS. 29A and 29B show a detection pattern of still another example of the ninth embodiment.

This is similar to the experiment 91 except that the pattern of the evaporated layer 10 is a desired picture-like form as shown in FIG. 29A.

Figure 29B:
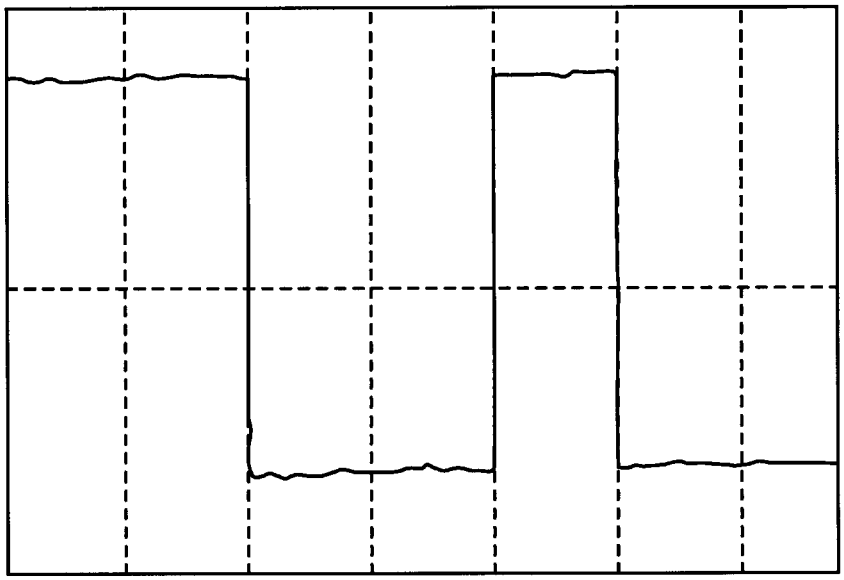

When the reflected light was detected by the optical sensor 74 in an oblique direction at 45 degrees with respect to the vertical incident light, a response signal as shown in FIG. 29B was obtained.

(Experiment 94)

This is similar to the experiment 91 except that the number of layers of the layer 10 is 3.

Figure 30:
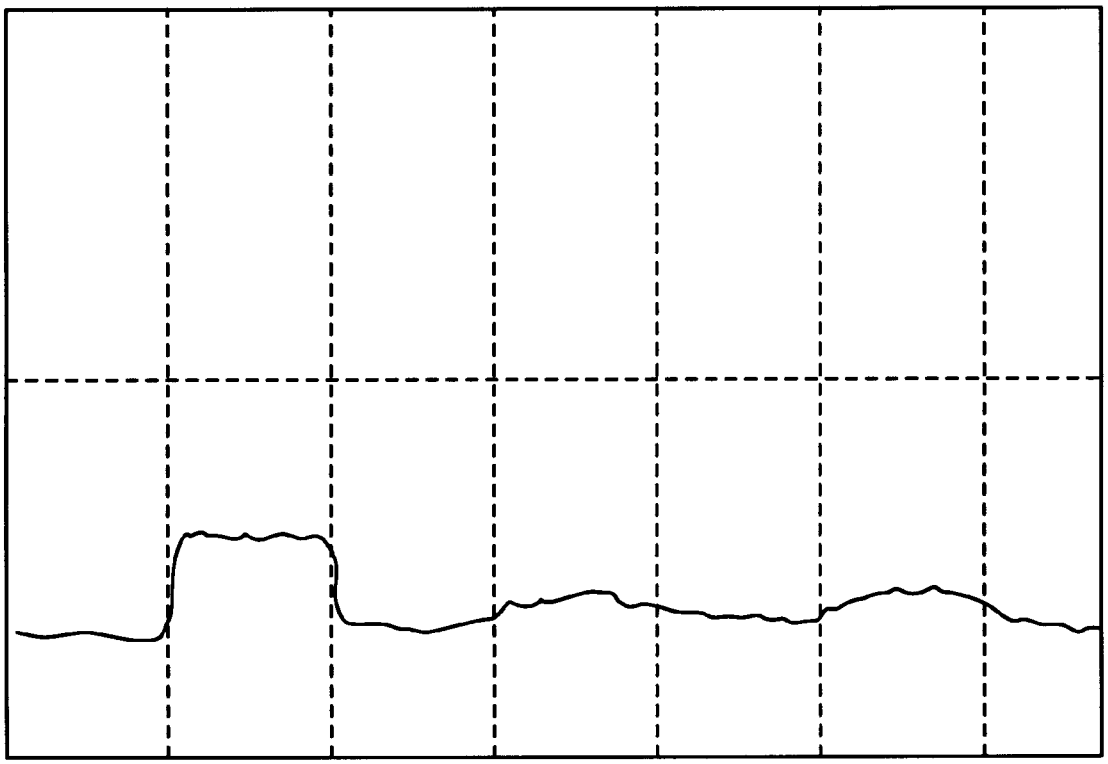
FIG. 30 shows a detection pattern of a comparison example of the ninth embodiment.

When the reflected light was detected by the optical sensor 74 in an oblique direction at 45 degrees with respect to the vertical incident light, a degraded response signal as shown in FIG. 30 was obtained.

As described above, according to this embodiment, the real or imitation of the laminated body can be determined by detecting the reflected light which is oblique with respect to the laminated body having the reflection layer, and an imitation of an article can be easily recognized by affixing the laminated body to the article.

Since this embodiment can record a bar-code by a patterned evaporated layer 10, it can be applied to a magnetic card (the laminated body is affixed to the magnetic card). As a result, the forgery preventing function can be made more effectively and easily.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the thickness or the number of ceramic layers constructing the transparent evaporated layer can be adequately set.

What is claimed is:

[1. A laminate body comprising:

a reflective base member; and a transparent layer formed on a portion of said base member such that a pattern is formed by contrast between the portion having the transparent layer formed thereon and a remainder portion, the transparent layer having a laminated structure of first and second ceramic materials having different refractive indices, the first and second ceramic materials being laminated by an evaporation method, the transparent layer selectively absorbing incident light rays such that a peak wavelength of absorption is shifted in an amount which depends on an angle of incidence of incident light rays, the selective absorption causing light emitted from the laminated body to have a color which varies depending on the angle of incidence of incident light rays, the color variation being detectable by an optical instrument.]

[2. The laminated body according to claim 1, wherein said first ceramic material is selected from the group consisting of magnesium oxide, silicon dioxide, magnesium fluoride, calcium fluoride, cerium fluoride, aluminum fluoride, and aluminum oxide and said second ceramic material is selected from the group consisting of titanium dioxide, zirconium dioxide, zinc sulfide, zinc oxide, indium oxide, cerium dioxide and tantalum oxide.]

[3. The laminated body according to claim 1, further comprising a thin film layer formed on said evaporated layer and formed of an element of one of groups III to VI or formed of an oxide, carbide, nitride, or boride of an element of one of groups III to VI.]

[4. The laminated body according to claim 1, further comprising a protection layer, which serves as an outer resistant member for said laminated body and is formed of diamond-like carbon, silicon carbide or boron carbide.]

[5. The laminated body according to claim 1, wherein said reflective base member reflects substantially all of the light incident thereon.]

6. A laminated body comprising:

a reflective base member; and a transparent layer formed on said base member and having a laminated structure of first and second ceramic materials having different refractive indices, a first portion of the transparent layer having a different number of layers in the laminated structure than a second portion of the transparent layer such that a pattern is formed by contrast between the first and second portions, the first and second ceramic materials being laminated by an evaporation method, the transparent layer selectively absorbing incident light rays such that a peak wavelength of absorption is shifted in an amount which depends on an angle of incidence of incident light rays, the selective absorption causing light emitted from the laminated body to have a color which varies depending on the angle of incidence of incident light rays, the color variation being detectable by an optical instrument.

7. The laminated body according to claim 6, wherein said first ceramic material is selected from the group consisting of magnesium oxide, silicon dioxide, magnesium fluoride, calcium fluoride, cerium fluoride, aluminum fluoride, and aluminum oxide and said second ceramic material is selected from the group consisting of titanium dioxide, zirconium dioxide, zinc sulfide, zinc oxide, indium oxide, cerium dioxide and tantalum oxide.

8. The laminated body according to claim 6, further comprising a thin film layer formed on said evaporated layer and formed of an element of one of groups III to VI or formed of an oxide, carbide, nitride, or boride of an element of one of groups III to VI.

9. The laminated body according to claim 6, further comprising a protection layer, which serves as an outer resistant member for said laminated body and is formed of diamond-like carbon, silicon carbide or boron carbide.

10. The laminated body according to claim 6, wherein said reflective base member reflects substantially all of the light incident thereon.

11. A laminated body comprising:

a reflective base member; and a transparent layer formed on said base member and having a laminated structure of first and second ceramic materials having different refractive indices, a first portion of the transparent layer having a thickness different than a thickness of a second portion of the transparent layer such that a pattern is formed by contrast between the first and second portions, the first and second ceramic materials being laminated by an evaporation method, the transparent layer selectively absorbing incident light rays such that a peak wavelength of absorption is shifted in an amount which depends on an angle of incidence of incident light rays, the selective absorption causing light emitted from the laminated body to have a color which varies depending on the angle of incidence of incident light rays, the color variation being detectable by an optical instrument.

12. The laminated body according to claim 11, wherein said first ceramic material is selected from the group consisting of magnesium oxide, silicon dioxide, magnesium fluoride, calcium fluoride, cerium fluoride, aluminum fluoride, and aluminum oxide and said second ceramic material is selected from the group consisting of titanium dioxide, zirconium dioxide, zinc sulfide, zinc oxide, indium oxide, cerium dioxide and tantalum oxide.

13. The laminated body according to claim 11, further comprising a thin film layer formed on said evaporated layer and formed of an element of one of groups III to VI or formed of an oxide, carbide, nitride, or boride of an element of one of groups III to VI.

14. The laminated body according to claim 11, further comprising a protection layer, which serves as an outer resistant member for said laminated body and is formed of diamond-like carbon, silicon carbide or boron carbide.

15. The laminated body according to claim 11, wherein said reflective base member reflects substantially all of the light incident thereon.

*16. A laminated body comprising:*

*base member;*

*hologram layer formed on said base member;*

*a transparent evaporated layer formed on said hologram layer and constructed by a laminated structure of first and second ceramic materials having different refractive indices, a first portion of the transparent layer having a different number of layers in the laminated structure than a second portion of the transparent layer such that a pattern is formed by contrast between the first and second portions, the first and second ceramic materials being laminated by an evaporation method; and*

*an adhesive layer formed on said transparent evaporated layer;*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*17. The laminated body according to claim 16, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*18. The laminated body according to claim 16, further comprising a thin film layer formed on said evaporated layer and formed of an element of III to VI group, the oxide, carbide, nitride, or boride thereof.*

*19. The laminated body according to claim 16, further comprising a protection layer on top surface of said body and formed of diamond-like carbon, silicon carbide or boron carbide.*

*20. A laminating body comprising:*

*base member;*

*a separating layer formed on said base member;*

*a hologram layer formed on said separating layer;*

*a transparent evaporated layer formed on said hologram layer and constructed by a laminated structure of first and second ceramic materials having different refractive indices, a first portion of the transparent layer having a different number of layers in the laminated structure than a second portion of the transparent layer such that a pattern is formed by contrast between the first and second portions, the first and second ceramic materials being laminated by an evaporation method; and*

*an adhesive layer formed on said transparent evaporated layer;*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*21. The laminated body according to claim 20, wherein said first ceramic material is one selected from a group consisting of magnesium oxide, silicone dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*22. The laminated body according to claim 20, further comprising a thin film layer formed on said evaporated layer and formed of an element of III to VI group, the oxide, carbide, nitride, or boride thereof.*

*23. The laminated body according to claim 20, further comprising a protection layer on top surface of said body and formed of diamond-like carbon, silicon carbide or boron carbide.*

*24. The laminated body according to claim 20, in which one of said adhesion layer and said separating layer is formed in a pattern form.*

*25. A laminated body comprising:*

*base member;*

*hologram layer formed on said base member;*

*transparent evaporated layer formed on said hologram layer and constructed by a laminated structure of first and second ceramic materials having different refractive indices, a first portion of the transparent layer having a different number of layers in the laminated structure than a second portion of the transparent layer such that a pattern is formed by contrast between the first and second portions, the first and second ceramic materials being laminated by an evaporation method;*

*a separating layer formed on said transparent evaporated layer; and*

*an adhesive layer formed on said separating layer,*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*26. The laminated body according to claim 25, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*27. The laminated body according to claim 25, further comprising a thin film layer formed on said evaporated layer and formed of an element of III to VI group, the oxide, carbide, nitride, or boride thereof.*

*28. The laminated body according to claim 25, further comprising a protection layer on top surface of said body and formed of diamond-like carbon, silicon carbide or boron carbide.*

*29. The laminated body according to claim 25, in which one of said adhesion layer and said separating layer is formed in a pattern form.*

*30. A laminated body comprising:*

*base member;*

*transparent evaporated layer formed on said base member and constructed by a laminated structure of first and second ceramic materials having different refractive indices, a first portion of the transparent layer having a different number of layers in the laminated structure than a second portion of the transparent layer such that a pattern is formed by contrast between the first and second portions, the first and second ceramic materials being laminated by an evaporation method; and*

*a print layer formed on said transparent evaporated layer and having a predetermined printed pattern,*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*31. The laminated body according to claim 30, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium*

*dioxide, zirconium dioxide, zinc sulfide, zinc oxide, indium oxide, cerium dioxide and tantalum oxide.*

*32. The laminated body according to claim 30, further comprising a thin film layer formed on said evaporated layer and formed of an element of III to VI group, the oxide, carbide, nitride, or boride thereof.*

*33. The laminated body according to claim 30, further comprising a protection layer on top surface of said body and formed of diamond-like carbon, silicon carbide or boron carbide.*

*34. The laminated body according to claim 30, in which said print layer is formed in a pattern form having a color which is the same as or similar to the color of said transparent evaporated layer viewed from a specific direction.*

*35. A laminated body comprising:*

*reflective base member; and*

*transparent evaporated layer formed on said base member and constructed by a laminated structure of first and second ceramic materials having different refractive indices, a first portion of the transparent layer having a different number of layers in the laminated structure than a second portion of the transparent layer such that a pattern if formed by contrast between the first and second portions, the first and second ceramic materials being laminated by an evaporation method,*

*the transparent layer selectively absorbing incident layer rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*36. The laminated body according to claim 35, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*37. The laminated body according to claim 35, further comprising a thin film layer formed on said evaporated layer and formed of an element of III to VI group, the oxide, carbide, nitride, or boride thereof.*

*38. The laminated body according to claim 35, further comprising a protection layer on top surface of said body and formed of diamond-like carbon, silicon carbide or boron carbide.*

*39. The laminated body according to claim 35, in which said base member is one selected from a group consisting of gold, aluminum, chrome and nickel.*

*40. A laminated body comprising:*

*a base member;*

*a print layer formed on said base member and having a predetermined printed pattern; and*

*a transparent evaporated layer formed on said print layer and constructed by a laminated structure of first and second ceramic materials having different refractive indices, a first portion of the transparent layer having a different number of layers in the laminated structure than a second portion of the transparent layer such that a pattern is formed by contrast between the first and second portions, the first and second ceramic materials being laminated by an evaporation method,*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*41. The laminated body according to claim 40, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*42. The laminated body according to claim 40, further comprising a thin film layer formed on said evaporated layer and formed of an element of III to VI group, the oxide, carbide, nitride, or boride thereof.*

*43. The laminated body according to claim 40, further comprising a protection layer on top surface of said body and formed of diamond-like carbon, silicon carbide or boron carbide.*

*44. A laminated body comprising:*

*base member;*

*hologram layer formed on said base member;*

*a transparent evaporated layer formed on said hologram layer and constructed by a laminated structure of first and second ceramic materials having different refractive indices, a first portion of the transparent layer having a thickness different from a thickness of a second portion of the transparent layer such that a pattern is formed by contrast between the first and second portions, the first and second ceramic materials being laminated by an evaporation method; and*

*an adhesive layer formed on said transparent evaporated layer,*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*45. The laminated body according to claim 44, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*46. The laminated body according to claim 44, further comprising a thin film layer formed on said evaporated layer and formed of an element of III to VI group, the oxide, carbide, nitride, or boride thereof.*

*47. The laminated body according to claim 44, further comprising a protection layer on top surface of said body and formed of diamond-like carbon, silicon carbide or boron carbide.*

*48. A laminated body comprising:*

*base member;*

*a separating layer formed on said base member;*

*a hologram layer formed on said separating layer;*

*a transparent evaporated layer formed on said hologram layer and constructed by a laminated structure of first and second ceramic materials having different refractive indices, a first portion of the transparent layer having a thickness different from a thickness of a second portion of the transparent layer such that a pattern is formed by contrast between the first and second portions, the first and second ceramic materials being laminated by an evaporation method; and*

*an adhesive layer formed on said transparent evaporated layer,*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*49. The laminated body according to claim 48, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*50. The laminated body according to claim 48, further comprising a thin film layer formed on said evaporated layer and formed of an element of III to VI group, the oxide, carbide, nitride, or boride thereof.*

*51. The laminated body according to claim 48, further comprising a protection layer on top surface of said body and formed of diamond-like carbon, silicon carbide or boron carbide.*

*52. The laminated body according to claim 48, in which one of said adhesion layer and said separating layer is formed in a pattern form.*

*53. A laminated body comprising:*

*base member;*

*hologram layer formed on said base member;*

*transparent evaporated layer formed on said hologram layer and constructed by a laminated structure of first and second ceramic materials having different refractive indices, a first portion of the transparent layer having a thickness different from a thickness of a second portion of the transparent layer such that a pattern is formed by contrast between the first and second portions, the first and second ceramic materials being laminated by an evaporation method;*

*a separating layer formed on said transparent evaporated layer; and*

*an adhesive layer formed on said separating layer,*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*54. The laminated body according to claim 53, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*55. The laminated body according to claim 53, further comprising a thin film layer formed on said evaporated layer and formed of an element of III to VI group, the oxide, carbide, nitride, or boride thereof.*

*56. The laminated body according to claim 53, further comprising a protection layer on top surface of said body and formed of diamond-like carbon, silicon carbide or boron carbide.*

*57. The laminated body according to claim 53, in which one of said adhesion layer and said separating layer is formed in a pattern form.*

*58. A laminated body comprising:*

*base member;*

*transparent evaporated layer formed on said base member and constructed by a laminated structure of first and second ceramic materials having different refractive indices, a first portion of the transparent layer having a thickness different from a thickness of a second portion of the transparent layer such that a pattern is formed by contrast between the first and second portions, the first and second ceramic materials being laminated by an evaporation method; and*

*a print layer formed on said transparent evaporated layer and having a predetermined printed pattern,*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*59. The laminated body according to claim 58, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*60. The laminated body according to claim 58, further comprising a thin film layer formed on said evaporated layer and formed of an element of III to VI group, the oxide, carbide, nitride, or boride thereof.*

*61. The laminated body according to claim 58, further comprising a protection layer on top surface of said body and formed of diamond-like carbon, silicon carbide or boron carbide.*

*62. The laminated body according to claim 58, in which said print layer is formed in a pattern form having a color which is the same as or similar to the color of said transparent evaporated layer viewed from a specific direction.*

*63. A laminated body comprising:*

*reflective base member; and*

*transparent evaporated layer formed on said base member and constructed by a laminated structure of first and second ceramic materials having different refractive indices, a first portion of the transparent layer having a thickness different from a thickness of a second portion of the transparent layer such that a pattern is formed by contrast between the first and second portions, the first and second ceramic materials being laminated by an evaporation method,*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*64. The laminated body according to claim 63, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*65. The laminated body according to claim 63, further comprising a thin film layer formed on said evaporated layer and formed of an element of III to VI group, the oxide, carbide, nitride, or boride thereof.*

*66. The laminated body according to claim 63, further comprising a protection layer on top surface of said body and formed of diamond-like carbon, silicon carbide or boron carbide.*

*67. The laminated body according to claim 63, in which said base member is one selected from a group consisting of gold, aluminum, chrome and nickel.*

*68. A laminated body comprising:*

*a base member;*

*a print layer formed on said base member and having a predetermined printed pattern; and*

*a transparent evaporated layer formed on said print layer and constructed by a laminated structure of first and second ceramic materials having different refractive indices, a first portion of the transparent layer having a thickness different from a thickness of a second portion of the transparent layer such that a pattern is formed by contrast between the first and second portions, the first and second ceramic materials being laminated by an evaporation method,*

*the transparent layer selectively absorbing incident light rays such that a peak wavelength of absorption is shifted in an amount which depends on an angle of incidence light rays,*

*the selective absorption causing light emitted from the laminated body to have a color which varies depending on the angle of incidence of incident light rays, the color variation being detectable by an optical instrument.*

*69. The laminated body according to claim 68, wherein said first ceramic material is one selected from a group consisting of magnesium oxide, silicon dioxide, magnesium fluoride, calcium fluoride, cerium fluoride, aluminum fluoride, and aluminum oxide and said second ceramic material is one selected from a group consisting of titanium dioxide, zirconium dioxide, zinc sulfide, zinc oxide, indium oxide, cerium dioxide and tantalum oxide.*

*70. The laminated body according to claim 69, further comprising a thin film layer formed on said evaporated layer and formed of an element of III to VI group, the oxide, carbide, nitride, or boride thereof.*

*71. The laminated body according to claim 70, further comprising a protection layer on top surface of said body and formed of diamond-like carbon, silicon carbide or boron carbide.*

* * * * *